US012367017B2

(12) United States Patent
Huang et al.

(10) Patent No.: US 12,367,017 B2
(45) Date of Patent: Jul. 22, 2025

(54) COMPUTER-SUPPORTED VISUAL DEFINITION OF CONDITIONAL AUTOMATIC ORDER SUBMISSIONS

(71) Applicant: Treasure Data, Inc., Mountain View, CA (US)

(72) Inventors: Yili Huang, Mountain View, CA (US); Alexis Jianghezi Zheng, Palo Alto, CA (US); Nick Kobayashi, San Bruno, CA (US); Reeba Benzialex, Belmont, CA (US); Kai Sasaki, Tokyo (JP); Yuichiro Kaneko, Tokyo (JP)

(73) Assignee: Treasure Data, Inc., Mountain View, CA (US)

( * ) Notice: Subject to any disclaimer, the term of this patent is extended or adjusted under 35 U.S.C. 154(b) by 244 days.

(21) Appl. No.: 18/343,852

(22) Filed: Jun. 29, 2023

(65) Prior Publication Data
US 2024/0126516 A1 Apr. 18, 2024

Related U.S. Application Data

(60) Provisional application No. 63/417,276, filed on Oct. 18, 2022.

(51) Int. Cl.
*G06F 8/34* (2018.01)
*G06F 3/0486* (2013.01)
*G06F 9/451* (2018.01)

(52) U.S. Cl.
CPC .............. *G06F 8/34* (2013.01); *G06F 3/0486* (2013.01); *G06F 9/451* (2018.02)

(58) Field of Classification Search
CPC ........... G06F 8/34; G06F 3/0486; G06F 9/451
See application file for complete search history.

(56) References Cited

U.S. PATENT DOCUMENTS

2002/0057292 A1   5/2002   Holtz
2008/0077873 A1   3/2008   Peterson
(Continued)

FOREIGN PATENT DOCUMENTS

WO   WO-2013057155 A1 *   4/2013   ........... G06F 9/4451

*Primary Examiner* — Ziaul A Chowdhury
(74) *Attorney, Agent, or Firm* — Baker Botts L.L.P.

(57) ABSTRACT

A host computer is programmed to receive input specifying definitions of two or more stages, each of the stages representing an attribute of one or more end-user profiles that have undertaken one or more interactions, using computing devices associated with the end-user profiles, with one or more networked computers. For each stage, the user computer can interoperate with a graphical user interface comprising a virtual canvas, a palette comprising a plurality of different graphical icons each representing at least an entry condition and an activation order for digital presentation of information. Visual selection and dragging operations can move copies of an entry condition icon and an activation icon from the palette to the virtual canvas. An entry condition icon is defined using rules to match one or more subsets of the end-user profiles and one or more subsets of the interactions. An activation icon has order attributes order for the digital presentation of information. Based on a visual definition of a stage, the host computer can automatically form and transmit, to one or more digital presentation channels, a particular activation order to execute the digital presentation of information to the one or more subsets of the end-user profiles based on the one or more order attributes.

24 Claims, 23 Drawing Sheets

(56) References Cited

U.S. PATENT DOCUMENTS

| | | | |
|---|---|---|---|
| 2013/0103446 A1* | 4/2013 | Bragdon | G06F 3/0488 705/7.15 |
| 2014/0298214 A1 | 10/2014 | Machalani et al. | |
| 2019/0287188 A1* | 9/2019 | Colafrancheschi | G06Q 50/02 |
| 2021/0224327 A1* | 7/2021 | Tahiri | G06Q 10/0637 |

* cited by examiner

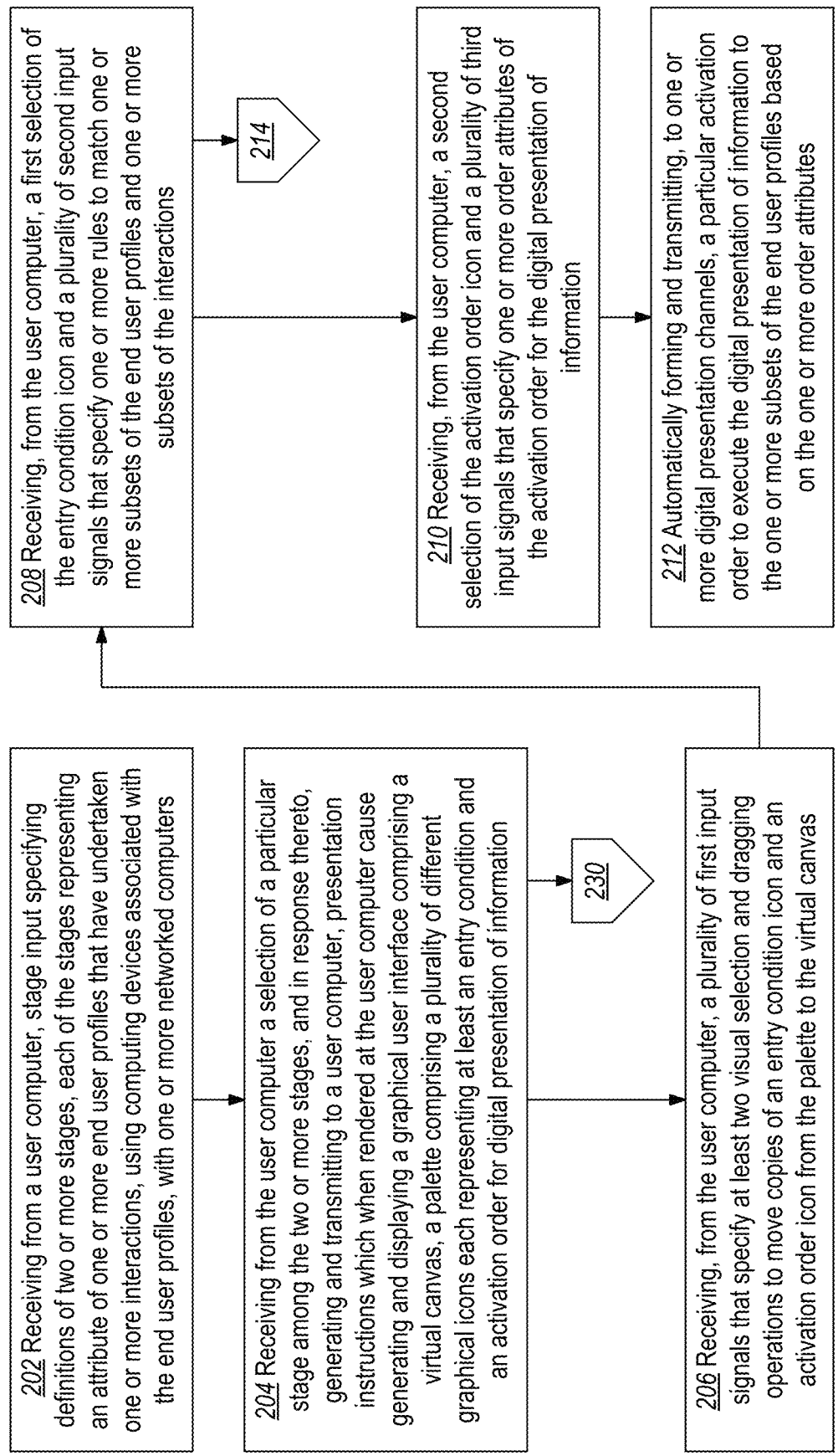

FIG. 2B

214 In response to a portion of the second input signals that specify the one or more rules to match the one or more subsets of the end user profiles, automatically querying a profiles database to select one or more counts of the end user profiles that match the one or more rules and displaying the one or more counts in the graphical user interface

FIG. 2C

216 Generating and transmitting to a user computer, the presentation instructions which when rendered at the user computer cause generating and displaying the palette comprising other graphical icons each representing a wait state, and a transition condition for the particular stage

↓

218 Receiving, from the user computer, fourth input signals that specify a further visual selection and dragging operation to move a copy of the wait state icon to the virtual canvas

↓

220 The particular activation order to execute the digital presentation of information to the one or more subsets of the end user profiles being scheduled based on a wait time value that is associated with the copy of the wait state icon

FIG. 2D

222 Generating and transmitting to a user computer, the presentation instructions which when rendered at the user computer cause generating and displaying the palette comprising a milestone widget

↓

224 Receiving, from the user computer, fourth input signals that specify a further visual selection of the milestone widget and one or more second rules to match one or more subsets of the end user profiles and one or more subsets of the interactions, and in response thereto, the host computer automatically instantiating a second entry point icon in a second particular stage among the two or more stages and populating entry point attributes of the second entry point icon based on the second rules

FIG. 2E

230 Creating and storing records of the two or more stages in association with a journey record specifying a virtual journey of the one or more end user profiles via the one or more interactions to interoperate with the one or more networked computers

↓

232 The virtual journey being associated with interactions indicating awareness of a product that is offered via the one or more networked computers, intent to acquire the product, and an acquisition transaction to acquire the product

Set Goal
Test Journey - Purchase    342

Name*  [Purchase Product]

Description  [Enter a description
              344]

Cancel    Next  345

Set entry criteria
Awareness   368

Name*  [Untitled entry criteria]

Description  [Purchase Product
              Visit Product Page
              Visit Website
              Attend Webinar
              Clicker on a link
              Purchase Product X]
              370

Match logic   [advanced ˅]   [1 and 2 or 3|  ⚠]   382

FIG. 3D

Purchase Product
Test Journey - Purchase

Refresh ⟳  of 3,877 total profiles accessible — 364

∨ 1. Name your rule set

A. Purchased — 358
   ▽ filters (1)
   checkout_event  =is  true — 360
   ▷ Count  ≥ at least  1  •  ⊙ Time frame  within  30  days — 362

350
352
356

Click or drag to add rules — 354

FIG. 3G

Visit Website Awareness  364

[Refresh] of 3,877 total profiles accessible

350

∨ 1. Name your rule set

A. Website Page Views  372    374

[filters (1)]
   td_url  =is  https://treasurebikes.com

△ Count  ≥ at least  1  •  ⊙ Time frame  within  30  days  376

352

Match logic [all ∨]  378
   all
   any
   advanced

∨ 2. Name your rule set

Match logic [all ∨]  380

A. Purchased  356
   [add filters]

△ Count  ≥ at least  1  •  ⊙ Time frame  within  30  days  377

B. Credit Card  357

353

COMPUTER-SUPPORTED VISUAL DEFINITION OF CONDITIONAL AUTOMATIC ORDER SUBMISSIONS

BENEFIT CLAIM

This application claims the benefit under 35 U.S.C. 119 of provisional application 63/417,276, filed Oct. 18, 2022, the entire contents of which are hereby incorporated by reference for all purposes as if fully set forth herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2021-2022 Treasure Data, Inc.

TECHNICAL FIELD

One technical field of the present disclosure is visual programming, in which computers generate and present visual graphical human-computer interfaces that can be used to define a stored program sequence of operations. Another technical field is the automatic submission of digital data, such as orders to undertake operations, from one computer system to another.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

Since the dawn of stored-program digital computers in the 1940s, people have sought better ways to write and submit stored program instructions to computers for execution. Programming techniques have involved moving toggle switches to specify binary values of addresses and data, using text-based terminals to specify assembly language that can be compiled into machine code capable of nearly direct execution by a processor, and using graphical terminals or general-purpose computers to specify programs in sequences of program statements in quasi-natural languages such as FORTRAN, C, PASCAL, JAVA, JAVASCRIPT, PYTHON, and others.

Visual programming is a later-stage development in this field. With visual programming, an author can define a computer program by interacting with a programmed tool that provides a graphical user interface. Visual symbols such as icons can represent program operations. Defining a program can involve selecting a first icon for an operation, moving the icon to a workspace, selecting a second icon for a second operation, and visually joining the first icon to the second icon using a specified command. After the visual definition of a program is complete, the programmed tool generates symbolic code or executable machine code corresponding to the visual definition.

While these techniques have spawned the discipline of software engineering and opened the world of computer programming to millions, visual programming has been challenging to apply to many domains of industry based on the specialized requirements of the domains. The use of visual programming with a new domain typically is not straightforward and requires a variety of inventive design choices, different architecture, or changed functional operations. Separate from visual programming, many domains of industry rely on the use of automatic submission of digital data, such as orders to undertake operations, from one computer system to another. Examples include engineering systems, enterprise purchasing systems, and digital advertising. In each of these industries, one computer system or program is typically used to define an order or set of instructions, which are submitted or transmitted to an independent, domain-specific system for inspection, use, or execution. In many environments of these types, orders or instructions are specified using forms, spreadsheets, rows in databases, or other means that are difficult for non-specialists to use.

In the specific domain of digital information presentation, a lack of customer context across channels of presentation and among working teams in enterprises can result in disjointed experiences for the consumer and excess spending on the presentation by the enterprise. So-called "customer journey orchestration" tools have relied on a limited set of data, and varying channel rules, which require complex integrations to connect channels to each presentation campaign. Information flows or "journeys" of customers typically are formed at the level of a campaign, and all audiences are treated the same. There is an acute need in this field for better tools to facilitate smarter interactions between an enterprise and its customers with unified customer data. There is a need for ways to define journeys across multiple channels of communication to provide improved personalization and budget efficiency.

SUMMARY

The appended claims may serve as a summary of the invention.

BRIEF DESCRIPTION OF THE DRAWINGS

In the drawings:

FIG. 2A illustrates an example computer-implemented process of visually defining a customer journey and transforming the visual definition into one or more activations in digital presentation channels.

FIG. 2B, FIG. 2C, FIG. 2D, FIG. 2E illustrate other computer-implemented operations that can execute asynchronously with respect to FIG. 2A.

FIG. 3C illustrates an example graphical user interface that is programmed to receive input to specify a Goal element of a journey.

FIG. 3D illustrates an example graphical user interface that is programmed to receive input to specify a Purchase element of a journey.

FIG. 3F illustrates an example graphical user interface that is programmed to receive input to specify criteria that establish Awareness as part of a journey.

FIG. 3G illustrates an example graphical user interface that is programmed to receive input to specify a plurality of rule sets and rules that establish Awareness as part of a journey.

FIG. 3H illustrates an example graphical user interface that is programmed to receive input to specify elements of match logic.

DETAILED DESCRIPTION

Figure 1:
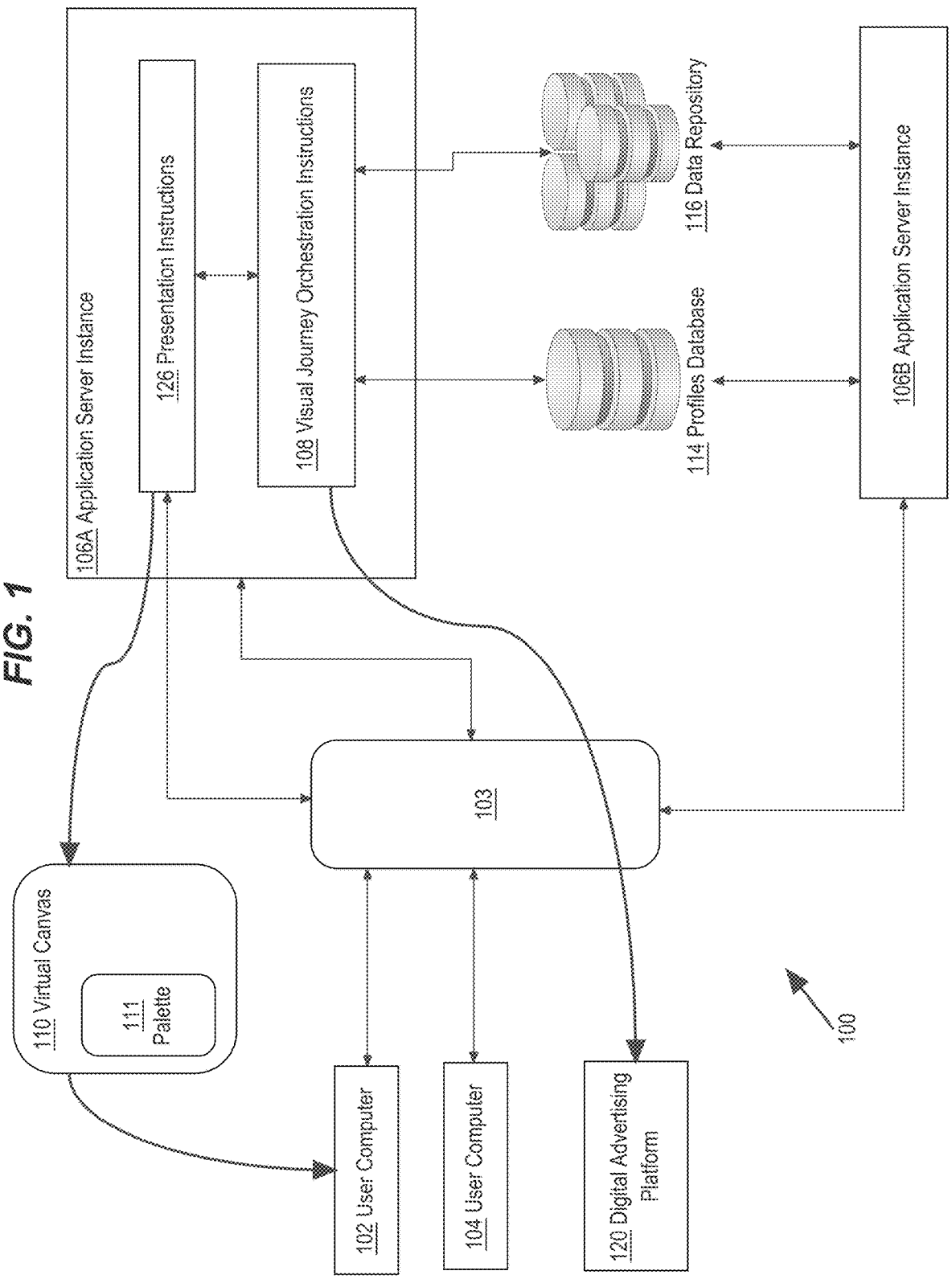
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in the sections below according to the following outline:

1. General Overview
2. Structural & Functional Overview
   2.1 Example Distributed Computer System
   2.2 Overview of Visual Journey Definition Process
   2.3 Example Graphical User Interface for Visual Journey Orchestration
3. Implementation Example—Hardware Overview

1. GENERAL OVERVIEW

Customer experience (CX) marketing is a specialty within the contemporary field of product marketing by which enterprises seek to understand what steps a customer prospect or actual prospect takes from initial awareness about a product or service to completion of a purchase, declining a purchase, and/or cessation of use of a product or service. As merchants have moved systems for advertising, marketing, ordering, and managing purchase to distributed computer systems using international internetworks, and as digital tracking technology has evolved, the task of determining what online interactions occur from awareness to purchase, or other actions, has become extraordinarily complex.

Marketing research has shown that customers don't care which digital advertising campaign or channel they are in; they see the business as one. But with multiple teams and business units, businesses often run campaigns in silos with different tools, creating an inconsistent customer experience. Those involved in marketing operations or CX management must rise above the single campaign to orchestrate a continuous personalized experience that cuts across channels and business units, with consent.

Embodiments of this disclosure have several useful applications. For example, a CX marketer may wish to create a journey to orchestrate interactions with consumers to improve business metrics such as engagement, purchase, or conversion. Or, a CX marketer may wish to improve return on investment by targeting end-user profiles with low-cost activations before higher-cost activations by setting up wait steps and multi-channel campaign activations. Examples of low-cost activations include in-game and email promotions. Examples of higher-cost activations include advertisements on the FACEBOOK platform or the GOOGLE search engine. In yet another alternative, a CX marketer may want to track the state of profiles and activations to determine whether customer journeys are effectively progressing profiles towards specified goals.

In one embodiment, a drag-and-drop virtual canvas enables a graphical definition of buying cycles or purchase journeys, including individual steps that can be associated with activations. The marketer can add wait steps between activations to order by cost and add more costly activations at later stages. A jump feature enables dragging and dropping a profile into an onboarding or retention journey. Therefore, embodiments enable users to follow customers across channels and steps in a particular journey. Furthermore, embodiments provide automated audience and profile segmentation and retargeting, enabling the user to change a segment of profiles in real time with retargeting to boost conversions.

Embodiments provide better tools to facilitate smarter interactions between an enterprise and its customers, with unified customer data. Embodiments enable defining a customer journey across multiple channels of communication, to provide improved personalization and budget efficiency. The user can visually map business rules and flows that dynamically synchronize decision-making for all channels and span multiple stages of customer interaction.

Various embodiments encompass the subject matter stated in the following numbered clauses:

1. A computer-implemented method comprising: using an application server instance, receiving from a user computer, input specifying definitions of two or more stages, each of the stages representing an attribute of one or more end-user profiles that have undertaken one or more interactions, using computing devices associated with the end-user profiles, with one or more networked computers different from the application server instance; using the application server instance, receiving from the user computer a selection of a particular stage among the two or more stages, and in response thereto, generating and transmitting to a user computer, presentation instructions which when rendered at the user computer cause generating and displaying a graphical user interface comprising a virtual canvas, a palette comprising a plurality of different graphical icons each representing at least an entry condition and an activation order for digital presentation of information, using the application server instance receiving, from the user computer, a plurality of first input signals that specify at least two visual selection and dragging operations to move copies of an entry condition icon and an activation icon from the palette to the virtual canvas; using the application server instance receiving, from the user computer, a first selection of the entry condition icon and a plurality of second input signals that specify one or more rules to match one or more subsets of the end-user profiles and one or more subsets of the interactions; using the application server instance receiving, from the user computer, a second selection of the activation icon and a plurality of third input signals that specify one or more order attributes of the activation order for the digital presentation of information; using the application server instance, accessing a digital data repository storing records of first interactions of a first plurality of profiles with a plurality of other computers, determining that the records specify a second plurality of profiles from among the first plurality of profiles that are associated with second interactions that match the one or more rules, and in response thereto, automatically forming and transmitting, to one or more digital presentation channels, a particular activation order to execute the digital presentation of information to the one or more subsets of the end-user profiles based on the one or more order 2. The computer-implemented method of clause 1, further comprising, in response to a portion of the second input signals that specify the one or more rules to match the one or more subsets of the end-user profiles, automatically querying a profiles database to select one or more counts of the end-user profiles that match the one or more rules and displaying the one or more counts in the graphical user interface.

3. The computer-implemented method of clause 1, further comprising: generating and transmitting to a user computer, the presentation instructions which when rendered at the user computer cause generating and displaying the palette comprising other graphical icons each representing a wait state, and a transition condition for the particular stage; using the application server instance receiving, from the user computer, fourth input signals that specify a further visual selection and dragging operation to move a copy of the wait state icon to the virtual canvas; the particular activation order to execute the digital presentation of information to the one or more subsets of the end-user profiles being scheduled based on a wait time value that is associated with the copy of the wait state icon.

4. The computer-implemented method of clause 1, further comprising: generating and transmitting to a user computer, the presentation instructions which when rendered at the user computer cause generating and displaying the palette comprising a milestone widget; using the application server instance receiving, from the user computer, fourth input signals that specify a further visual selection of the milestone widget and one or more second rules to match one or more subsets of the end-user profiles and one or more subsets of the interactions, and in response thereto, the application server instance automatically instantiating a second entry point icon in a second particular stage among the two or more stages and populating entry point attributes of the second entry point icon based on the second rules.

5. The method of clause 4, further comprising, using the application server instance, accessing the digital data repository and determining that the records specify a third plurality of profiles from among the first plurality of profiles that are associated with fourth interactions that match the one or more second rules of the second entry point, and in response thereto, automatically forming and transmitting, to one or more digital presentation channels, a second particular activation order to execute the digital presentation of information to the one or more subsets of the end-user profiles based on the one or more order attributes.

6. The computer-implemented method of clause 1, the digital presentation of information comprising digital advertising.

7. The computer-implemented method of clause 6, the particular activation order to execute the digital presentation of information comprising a set of digital advertising order attributes and instructions including an identifier of a particular platform interface to a particular digital advertising platform from among a plurality of different digital advertising platforms.

8. The computer-implemented method of clause 1, further comprising creating and storing records of the two or more stages in association with a journey record specifying a virtual journey of the one or more end-user profiles via the one or more interactions to interoperate with the one or more networked computers.

9. The computer-implemented method of clause 8, the virtual journey being associated with interactions indicating awareness of a product that is offered via the one or more networked computers, intent to acquire the product, and an acquisition transaction to acquire the product.

10. The computer-implemented method of clause 1, further comprising, using the application server instance receiving, from the user computer: a third selection of a decision point icon in the palette and a plurality of fourth input signals that specify dragging and dropping the decision point icon into the virtual canvas and rules for two or more conditions associated with the decision point icon; a fourth selection of any of a second activation icon and a wait step icon in the palette and a plurality of fifth input signals that specify dragging and dropping the second activation icon or the wait step icon into the virtual canvas in a first position serially after one of the two or more conditions.

11. The computer-implemented method of clause 10, further comprising, using the application server instance receiving, from the user computer a fifth selection of a merge icon in the palette and a plurality of sixth input signals that specify dragging and dropping the merge icon into the virtual canvas in a second position serially after two of the two or more conditions.

12. The computer-implemented method of clause 10, further comprising, using the application server instance, accessing the digital data repository and determining that the records specify a third plurality of profiles from among the first plurality of profiles that are associated with fourth interactions that match the rules for two or more conditions associated with the decision point icon, and in response thereto, automatically forming and transmitting, to one or more digital presentation channels, a second particular activation order to execute the digital presentation of information to the one or more subsets of the end-user profiles based on the one or more order attributes.

2. STRUCTURAL & FUNCTIONAL OVERVIEW

In an embodiment, a host computer is programmed to receive input specifying definitions of two or more stages, each of the stages representing an attribute of one or more end-user profiles that have undertaken one or more interactions, using computing devices associated with the end-user profiles, with one or more networked computers. For each stage, the user computer can interoperate with a graphical user interface comprising a virtual canvas and a virtual graphical palette comprising a plurality of different graphical icons, each representing at least an entry condition and an activation order for the digital presentation of information. Visual selection and dragging operations can move copies of an entry condition icon and an activation icon from the palette to the virtual canvas. An entry condition icon is defined using rules to match one or more subsets of the end-user profiles and one or more subsets of the interactions. An activation icon has order attributes order for the digital presentation of information. Based on a visual definition of a stage, the host computer can automatically form and transmit, to one or more digital presentation channels, a particular activation order to execute the digital presentation of information to the one or more subsets of the end-user profiles based on the one or more order attributes.

2.1 Example Distributed Computer System

FIG. 1 illustrates a distributed computer system showing the context of use and principal functional elements with which one embodiment could be implemented. In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

In an embodiment, a plurality of user computers 102, 104 are communicatively coupled using a data communications network 103 to two or more application server instances 106A, 106B, each of which is coupled to a shared filesystem comprising a profiles database 114 and a data repository 116. Each of the user computers 102, 104 can comprise any of a desktop computer, workstation, laptop computer, tablet computer, mobile computing device, or smartphone. Each of the user computers 102, 104 can comprise the hardware components and architecture shown in FIG. 8, which is described in other sections herein. Each of the user computers 102, 104 typically hosts an operating system, one or more application programs such as business or personal productivity applications, and an internet browser like FIREFOX, DUCKDUCKGO, EDGE, CHROME, or SAFARI.

Network 103 broadly represents one or more local area networks, wide area networks, campus networks, internetworks, or a combination thereof, including but not limited to the public internet.

Each of the application server instances 106A, 106B can comprise a computer, processor cluster, or virtual machine instance in any of an enterprise facility, private datacenter, public datacenter, or online cloud computing facility such as AMAZON AWS, MICROSOFT AZURE, and the like. For purposes of illustrating a clear example, assume that each of the application server instances 106A, 106B is associated with a different enterprise, user, or licensee, and that user computer 102 accesses and uses only application server instance 106A and user computer 104 accesses and uses only application server instance 106B. With this architecture, the application server instances 106A, 106B can be coupled to shared multi-tenant storage in the form of a data repository 116, which can enforce tenant-specific security controls to ensure that only an authorized user computer can create, read, update, or delete data pertaining to the instance with which that user computer is associated.

Each of the application server instances 106A, 106B typically hosts an instance of a software-as-a-service (SaaS) application, such as a database application, although the specific application program can vary in different embodiments and can be compatible with any domain, industry, or field, such as finance, education, healthcare, manufacturing, and others. For clarity, the SaaS application hosted with the application server instances 106A, 106B is omitted from FIG. 1. The functional elements of application server instances 106A, 106B relevant to this disclosure can comprise visual journey orchestration instructions 108 and presentation instructions 126. These elements are shown, as an example, in application server instance 106A.

The functional elements are programmed to interoperate to facilitate creating one or more instances of a virtual canvas 110 to present visually at user computers 102, 104 via presentation instructions and a graphical user interface that the user computers support. The virtual canvas 110 can implement a graphical virtual palette 111 from which user input can select and drag graphical icons representing entry points, actions, wait states, decision points, merge points, activation points, and exit points into the virtual canvas to define visual journeys of third-party users or customers. A visual journey can comprise two or more stages. After definition, application server instances 106A, 106B can interoperate the profiles database 114 and data repository 116 to determine whether data in the data repository indicates that audiences, segments, groups, or counts of profiles match conditions, decision points, actions, or states of a visual journey and, in response to matches, to advance to further conditions, decision points, actions, or states and/or execute responsive actions.

In some instances, evaluating the data in data repository 116 against a defined visual journey can initiate one or more activations that cause instructing a digital advertising platform 120 to present content to sets of profiles in profiles database 114 associated with the user computers 102, 104 or other c computers. The digital advertising platform 120 can comprise a demand-side platform (DSP), ad server, or one or more other computers programmed to receive instructions concerning the presentation of digital content to end-user devices.

In this manner, the system can implement a flexible design system to create representations of how third parties, such as customers, interact with brands, websites, emails, and other resources, to select segments of those parties, and to define when to trigger or initiate specified kinds of digital electronic content presentations to the segments or to profiles among the segments. The design system uses an innovative graphical user interface that enables users such as marketers to efficiently visually design sequences of graphical elements that represent points at which third parties or customers engage with specific online digital resources.

The architectural description of FIG. 1 and the functional description of computer system 100 and its functional elements in this disclosure primarily focus on a visual journey definition and editing mode, stage, or phase in which a user computer 102 can provide visual, drag-and-drop input in a virtual canvas to graphically represent interactions of other users or customers with digital resources, and store the resulting visual journey representation in the shared filesystem data repository 116. The data repository 116 can be programmed using a relational table schema or graph database techniques to support storing data representing a journey.

The data repository 116 also can be programmed to store collected signal data. In an embodiment, functional elements outside the scope of this disclosure are programmed to receive, obtain or collect signals representing actual interactions of user profiles with real-world computing elements such as web servers, message servers, transaction servers, payment servers, and others, and to store those signals in data repository 116. The data repository 116 thus can contain relational tables or other structured data storing tens of millions of signals from the computing devices of user profiles that represent actual interactions with the real-world computing elements. Website click data, message open and read signals, shopping cart signals, and other similar signals representing interactions of computing devices with other computing elements can contribute to data repository 116.

After creating a visual journey on the virtual canvas 110, using visual journey orchestration instructions 108 and the techniques herein, the same user computer 102 or a different user computer 104 can deploy the journey. Deployment causes one of the application server instances 106A, 106B to periodically query the data repository 116 to retrieve stored signals representing customer interactions with digital resources and to evaluate result sets of signals, from the queries, in relation to the defined journey. One or more of the application server instances 106A, 106B can be programmed to determine whether conditions of a journey definition are satisfied based on the signals from the data repository 116 and whether actions of the journey definition specify to generate and transmit an activation to the digital advertising platform 120. Thus, visual journey orchestration, as explained in this disclosure, provides a way to visually and graphically plan a set of conditions, actions, branches, and paths for evaluating signal data of data repository 116 and to automatically generate activations for the digital advertising platform 120 based on specified combinations of conditions, actions, user profiles, and signals.

The post-installation mode, stage, or phase of use can be termed runtime. Each of the application server instances 106A, 106B can include functional elements not shown in FIG. 1 to load and evaluate a journey at runtime and to generate one or more activations to transmit to digital advertising platform 120.

2.2 Overview of Visual Journey Definition Process

FIG. 2A illustrates an example computer-implemented process of visually defining a customer journey and transforming the visual definition into one or more activations in digital presentation channels. FIG. 2B, FIG. 2C, FIG. 2D, FIG. 2E illustrate other computer-implemented operations that can execute asynchronously with respect to FIG. 2A. FIG. 2A and each other flow diagram herein is intended as an illustration of the functional level at which skilled persons, in the art to which this disclosure pertains, communicate with one another to describe and implement algorithms using programming. The flow diagrams are not intended to illustrate every instruction, method object, or sub-step that would be needed to program every aspect of a working program but are provided at the same functional level of illustration that is normally used at the high level of skill in this art to communicate the basis of developing working programs.

FIG. 2A, FIG. 2B, FIG. 2C, FIG. 2D, FIG. 2E will provide a functional view of computer processes that can execute using the processing elements of FIG. 1 to support visual design of customer journeys as shown in certain screen grabs or screen captures of the other drawing figures, which are described in other sections. In this context, a "journey definition," "journey" or "customer journey" comprises a set of data, which can be digitally stored in the data repository 116, specifying a sequence of conditions and actions which, if satisfied by a set of user profiles in the profiles database 114 and signals of the data repository 116 representing real-world interactions of devices with computing devices, programmatically causes automatically initiating one or more activations of presentations of digital content via the digital advertising platform 120. While a journey can be visually defined using the graphical techniques shown herein, each graphical view of a journey is backed by digitally stored data representing the elements of the journey and the relationships among them.

Referring first to FIG. 2A, in an embodiment, a computer-implemented process can be programmed at block 202 for receiving from a user computer stage input specifying definitions of two or more stages, each of the stages representing an attribute of one or more end-user profiles that have undertaken one or more interactions, using computing devices associated with the end-user profiles, with one or more networked computers. As an example, a user computer can interact with a graphical user interface displayed in a browser of the user computer to supply input to the server computer to visually define a customer journey definition in two or more stages.

Examples of stages, in one embodiment, include Awareness, Interest, Consideration, Intent, and Purchase. The interactions can comprise requests, responses, or other signals of end-user computing devices interoperating with networked computers, such as web servers, transaction servers, and payment servers. End-user profiles can comprise digitally stored metadata representations of classes or categories of end-user computers or users using de-identified or anonymized data. For example, a profile can refer to a particular end-user computer or its user in a de-identified manner, and a segment or audience segment can refer to a group of profiles that share demographic, transactional, or commercial characteristics.

While abstract labels can be applied to stages, each stage corresponds to real-world interactions of the computing devices of end-users with real-world computing elements such as web servers, message servers, transaction servers, payment servers, and others. For example, a user computer accessing a product or merchant web server can signal Awareness; the user computer requesting and receiving or browsing a plurality of different web pages corresponding to product features can signal Interest; the user computer providing input to a server to mark a particular product for cross-comparison with others can signal Consideration; the user computer providing input to the merchant server to move a particular product to a virtual shopping cart can indicate Intent; and the user computer supplying payment information to the merchant site or to a payment processor can signal a Purchase. Embodiments are concerned with the computer-implemented interpretation of these specific signals in comparison to elements of a visual journey definition rather than the abstract labels.

At block 204, the process is programmed for receiving from the user computer a selection of a particular stage among the two or more stages and, in response thereto, generating and transmitting to a user computer presentation instructions which, when rendered at the user computer cause generating and displaying a graphical user interface comprising a virtual canvas, a palette comprising a plurality of different graphical icons each representing at least an entry condition and an activation order for digital presentation of information. For example, user computer 102 interacts with the graphical user interface of block 202 to select one of the stages and signal the selected stage to the application server instance 106A; in response, visual journey orchestration instructions 108 generate presentation instructions 126 to show the virtual canvas 110 via the browser of the user computer 102.

Optionally depending on input from user computer 102, the process can transfer control to block 230, which is described in a separate section. Or, at block 206, the process is programmed for receiving, from the user computer, a plurality of first input signals that specify at least two visual selection and dragging operations to move copies of an entry condition icon and an activation icon from the palette to the virtual canvas. User computer 102 can interact with a palette of the virtual canvas 110 to signal the selection, using drag-and-drop operations, of an entry condition icon and an activation icon from the palette to the virtual canvas. In response, application server instance 106A updates the virtual canvas 110 to show the icons in serial order in a graphical visual representation of a customer journey.

At block 208, the process is programmed for receiving, from the user computer, a first selection of the entry condition icon and a plurality of second input signals that specify one or more rules to match one or more subsets of the end-user profiles and one or more subsets of the interactions. For example, user computer 102 can interact with a rules panel of the graphical user interface to provide input to select rules having conditions that match end-user profiles stored in profiles database 114, and associate the one or more rules with the entry condition icon.

The process can optionally transfer control to block 214. As shown in FIG. 2B, in an embodiment, at block 214 the process can be programmed for, in response to a portion of the second input signals that specify the one or more rules to match the one or more subsets of the end-user profiles, automatically querying a profiles database to select one or more counts of the end-user profiles that match the one or more rules and displaying the one or more counts in the graphical user interface. Block 214 enables previewing counts of profiles that are likely to trigger rules then-currently included in the visual journey in the virtual canvas 110. Such a preview is useful, for example, to enable the user computer 102 to provide updated input to change rules associated with a journey and thereby change the likely counts of user profiles.

Referring again to FIG. 2A, after block 208, at block 210, the process is programmed for receiving, from the user computer, a second selection of the activation icon and a plurality of third input signals that specify one or more order attributes of the activation order for the digital presentation of information. For example, user computer 102 can select an activation icon of a visual customer journey shown in the virtual canvas 110 and provide input that specifies order attributes for a digital advertising order or other data that the digital advertising platform 120 can use to form and deliver digital content to profiles. To cause an activation order to launch at the digital advertising platform 120, the process at block 212 can be programmed for the host computer to automatically form and transmit, to one or more digital presentation channels, a particular activation order to execute the digital presentation of information to the one or more subsets of the end-user profiles based on the one or more order attributes. In this context, digital advertising platform 120 broadly represents one or more computers, computing devices, virtual compute instances, and/or virtual storage instances that are programmed to implement any digital presentation channel, such as a demand-side platform (DSP), digital advertising server, or digital ad network. Typically digital advertising platform 120 comprises a third-party or independent computing unit compared to application server instances 106A, 106B, but an embodiment can integrate them.

A visual journey represented in the virtual canvas 110 can have icons defining other actions or conditions that can drive or launch other activations at different times and/or for different user profiles based on different rules associated with those actions or conditions. As shown in FIG. 2C, in an embodiment, a computer-implemented process can be programmed at block 216 to execute, asynchronously with respect to FIG. 2A, FIG. 2B, generating and transmitting to a user computer, presentation instructions which when rendered at the user computer cause generating and displaying the palette comprising other graphical icons, each representing a wait state and a transition condition for the particular stage. User computer 102 can provide input to select such icons from the palette of the virtual canvas 110 and move the icons to the virtual canvas, joining the icons into more complex representations of a visual journey for later evaluation against profiles of the profiles database 114 to launch other kinds of activations.

At block 218, the process of FIG. 2C can include using the host computer for receiving, from the user computer, fourth input signals that specify a further visual selection and dragging operation to move a copy of the wait state icon to the virtual canvas. Wait state icons can represent intentionally introduced delays in a visual journey definition, for example, to allow the data repository 116 to accumulate over time other signals from end-user computing devices that may change how later conditions of the journey definition evaluate. Further, at block 220, the process can include scheduling a particular activation order to execute the digital presentation of information to one or more subsets of the end-user profiles based on a wait time value that is associated with the copy of the wait state icon. For example, an activation order can occur one or more hours or days later based on time values specified in wait state icons.

Visual definitions of journeys also can comprise visual representations of milestones. In this context, a milestone is a significant advance or major event along a customer journey. Referring now to FIG. 2D, in an embodiment, at block 222, a computer-implemented method can be programmed for generating and transmitting to a user computer presentation instructions which, when rendered at the user computer, cause generating and displaying the palette comprising a milestone widget. Thus, the palette of virtual canvas 110 can include a milestone widget that user computer 102 can select to change how a journey interprets signal data in the data repository 116 to determine whether a milestone was achieved.

At block 224, the method can be programmed for receiving, from the user computer, fourth input signals that specify a further visual selection of the milestone widget and one or more second rules to match one or more subsets of the end-user profiles and one or more subsets of the interactions, and in response thereto, the host computer automatically instantiating a second entry point icon in a second particular stage among the two or more stages and populating entry point attributes of the second entry point icon based on the second rules. For example, user computer 102 can provide input in the graphical user interface to select the milestone widget and define rules as specified.

In any of the foregoing embodiments, the digital presentation of information can comprise digital advertising. A particular activation order can execute the digital presentation of information comprising a set of digital advertising order attributes and instructions, including an identifier of a particular platform interface to a particular digital advertising platform from among a plurality of different digital advertising platforms.

In any of the foregoing embodiments, as shown in FIG. 2E, the processes can be programmed for creating and storing records of the two or more stages of block 202 in association with a journey record specifying a virtual journey of one or more end-user profiles via one or more interactions to interoperate with one or more networked computers. For example, a journey record representing a journey can be stored in the data repository 116 for later evaluation against user profiles stored in the profiles database 114. As shown in block 232, in any such embodiment, a virtual journey can be associated with interactions indicating awareness of a product that is offered via one or more networked computers, intent to acquire the product, and an acquisition transaction to acquire the product. Signals indicating awareness are obtained at runtime from data repository 116 and evaluated against the journey record to determine whether to trigger activations.

2.3 Example Graphical User Interface for Visual Journey Orchestration

Figure 3A:
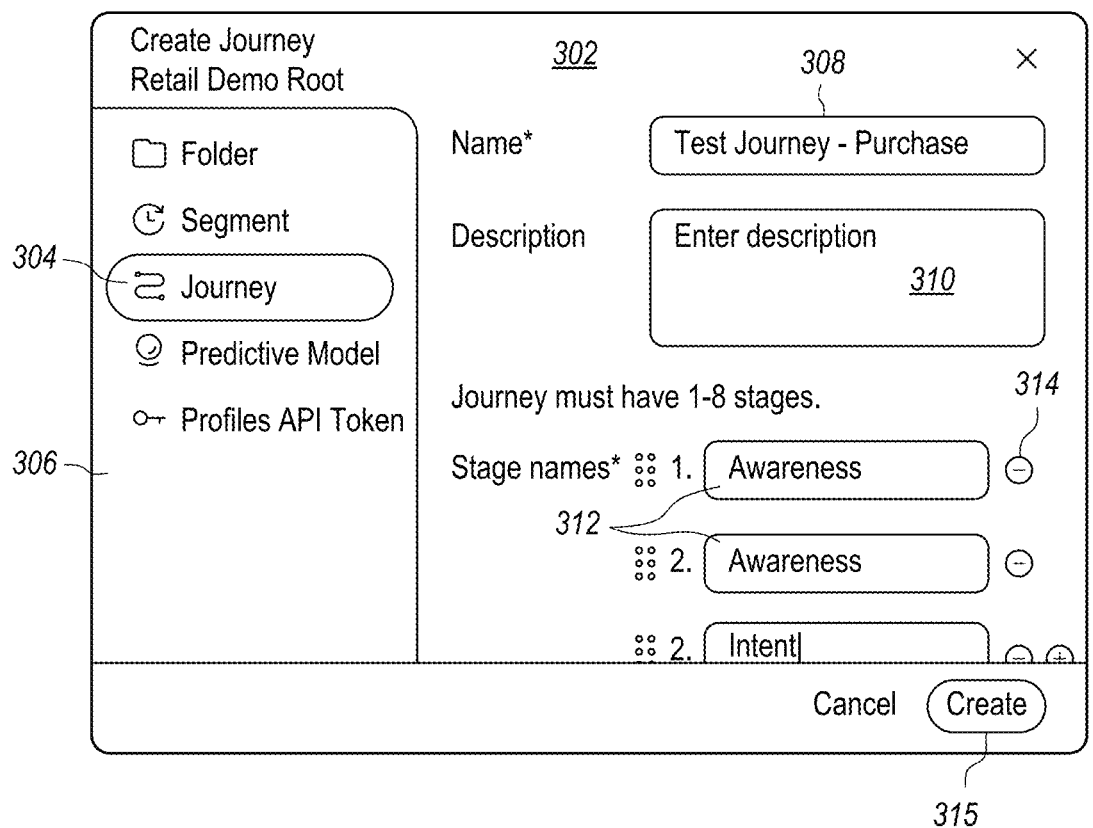
FIG. 3A illustrates an example graphical user interface that is programmed to receive input to create a journey.

FIG. 3A illustrates an example graphical user interface that is programmed to receive input to create a journey. In an embodiment, a journey creation page 302 comprises a selected function 304, a function tray 306, a name field 308, a description field 310, stage names 312, control widget 314, and CREATE link 315. The function tray 306 is configured to display a plurality of links to activate functions corresponding to the link names; in one embodiment, the function tray includes links to inspect or update folders, customer or audience segments, journeys, predictive models or API keys or tokens. In an embodiment, input from a user computer 102 to select a link in the function tray causes transmitting a request to an application server instance 106A to generate and return presentation instructions for a page with content corresponding to the selected function. In the example of FIG. 3A, the journey function has been selected, as indicated visually by selected function 304.

With the journey function selected, further input from user computer 102 can define a journey. For example, user computer 102 can specify a journey name using the name field 308, a journey description using the description field 310, and one or more stage names 312 corresponding to one or more stages of a customer journey. Each of the stage names 312 has an associated control widget 314 that can be selected to remove the corresponding stage from the journey or add a stage. When the fields depicted in FIG. 3A are complete an input from user computer 102 to select the CREATE link 315 causes transmitting the data shown in the GUI to the application server instance 106A, which responds by creating and storing a new journey record in the data repository 116.

Figure 3B:
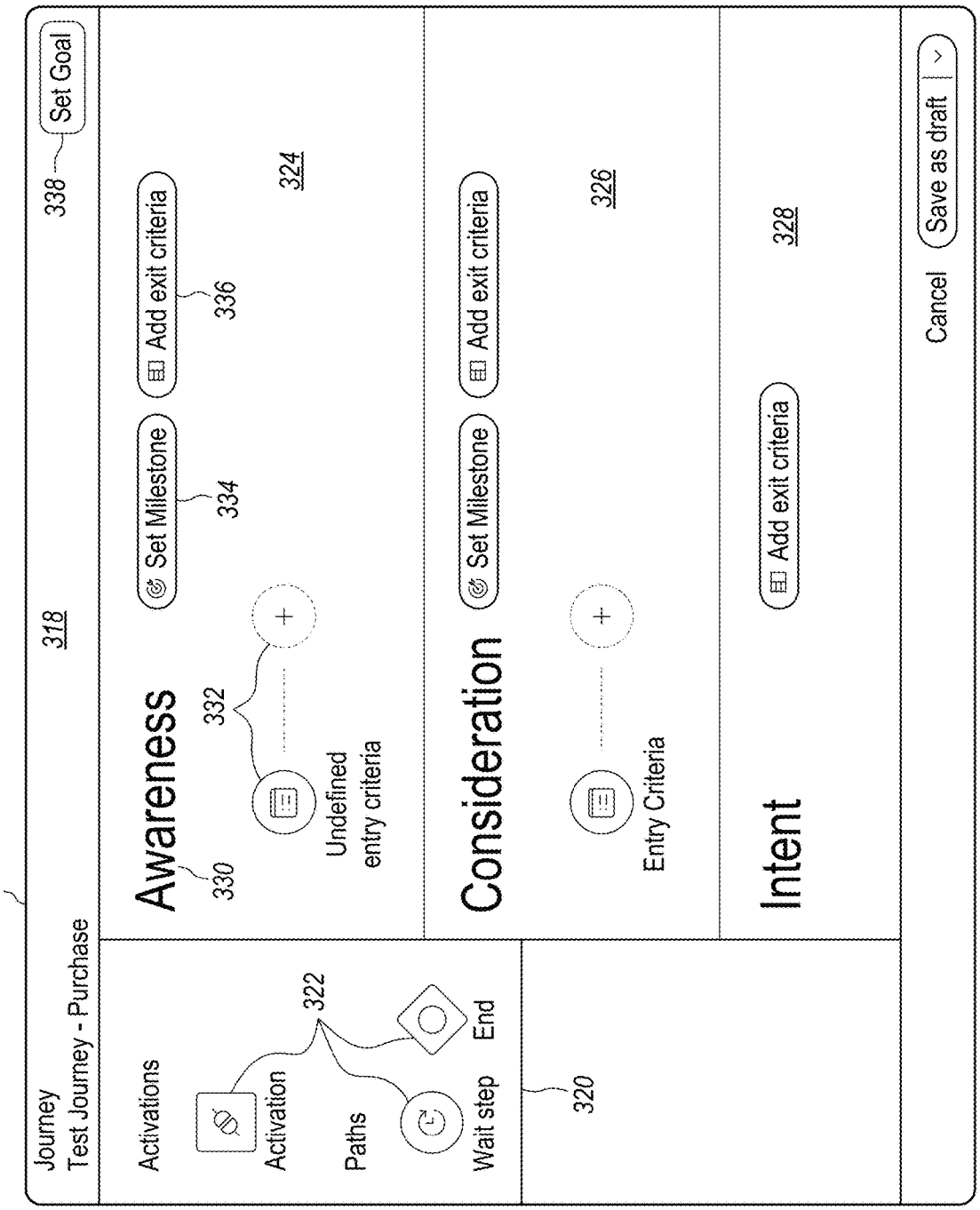
FIG. 3B illustrates an example graphical user interface that is programmed to receive drag-and-drop input from a palette to a virtual canvas to create a portion of a journey.

Further, after creating the journey record, the application server instance 106A generates and returns presentation instructions for a page that is configured to receive drag-and-drop input from a palette to a virtual canvas to create a portion of a journey. FIG. 3B illustrates an example graphical user interface that is programmed to receive drag-and-drop input from a palette to a virtual canvas to create a portion of a journey. In an embodiment, a GUI 316 of FIG. 3B comprises a virtual canvas 318 and a palette 320. The palette 320 comprises a plurality of icons 322, each being a graphical icon, each programmed to accept input to drag and drop a copy of the icon into the virtual canvas 318. The plurality of icons 322 can represent entry criteria, wait steps, activations, endpoints, and other elements of a stage.

In an embodiment, virtual canvas 318 comprises a plurality of stage panels 324, 326, 328 in which input from user computer 102 can specify a series of icons to represent corresponding stages of a journey. In an embodiment, each of the stage panels 324, 326, 328 comprises a stage name 330, one or more icons 332 representing states and transitions of a stage, a milestone control 334, an exit control 336, and a goal control 338. Input from user computer 102 can drag and drop any icon from among of the plurality of icons 322 from the palette 320 into a stage panel 324, 326, 328, resulting in fixing the icons 332 in the stage panel.

In an embodiment, dragging a particular icon from among the plurality of icons 322 from palette 320 toward a stage panel 324 and dropping the particular icon in the stage panel causes the particular icon to visually snap onto a terminal icon 332 that can be identified using a distinctive symbol, such as "+" in the example of FIG. 3B. See also the terminal icon 516 of FIG. 5A. Further, the receiving icon is redisplayed in a new position linearly to the right or side of the particular icon that was just added. Further input from the user computer 102 can repeat the foregoing process to add any number of icons from the plurality of icons 322 from palette 320 to any of the stage panels 324, 326, 328.

Figure 4A:
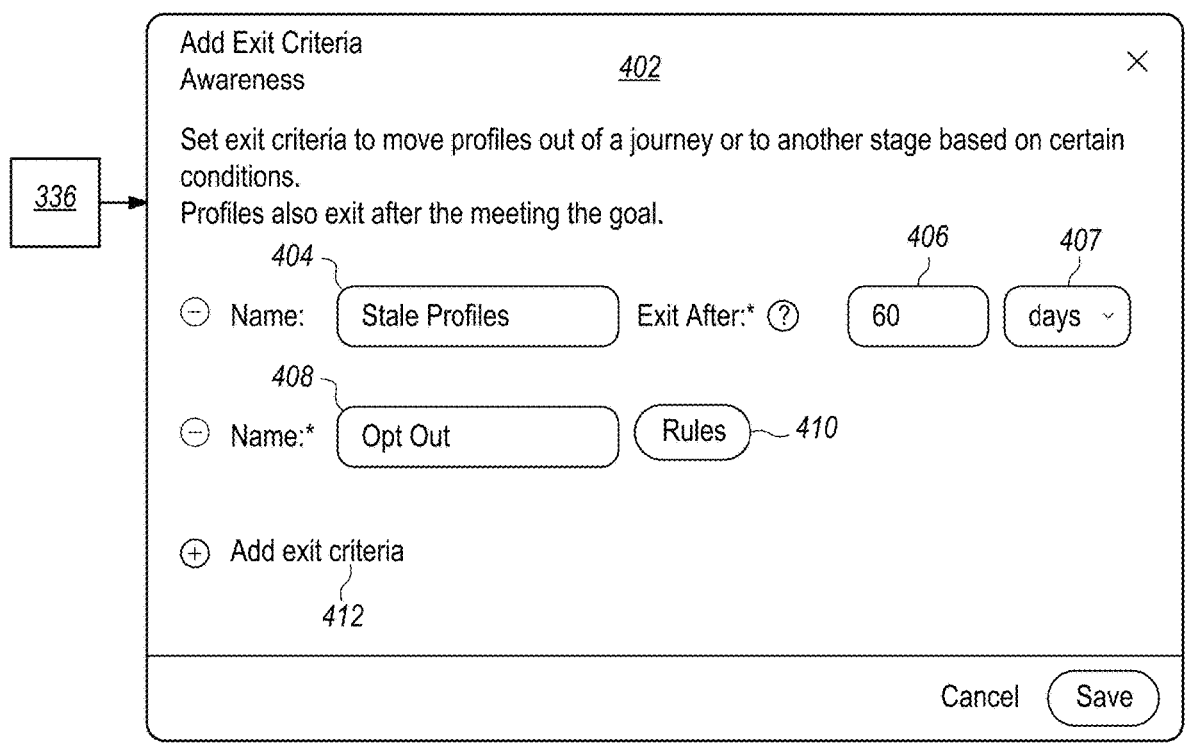
FIG. 4A illustrates an example graphical user interface that is programmed to receive input to define exit criteria.
Figure 4B:
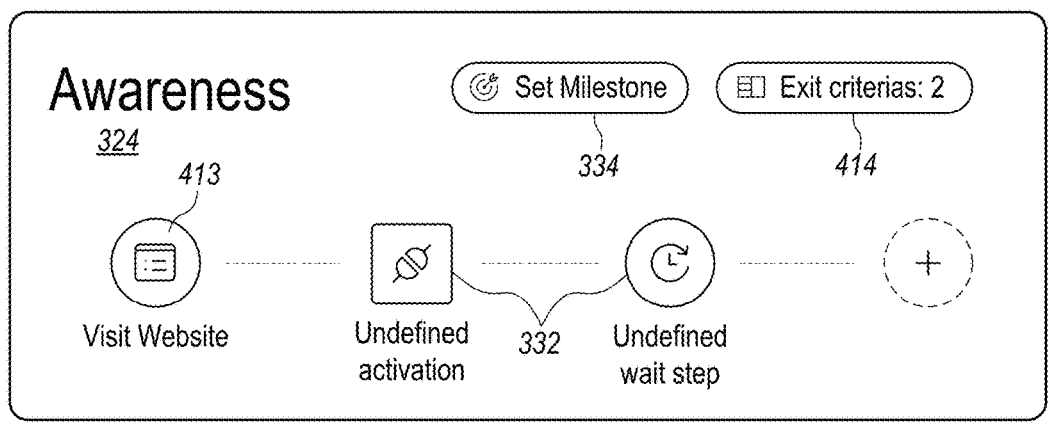
FIG. 4B illustrates an example graphical user interface showing visual elements of an Awareness portion of a visual journey definition.
Figure 4C:
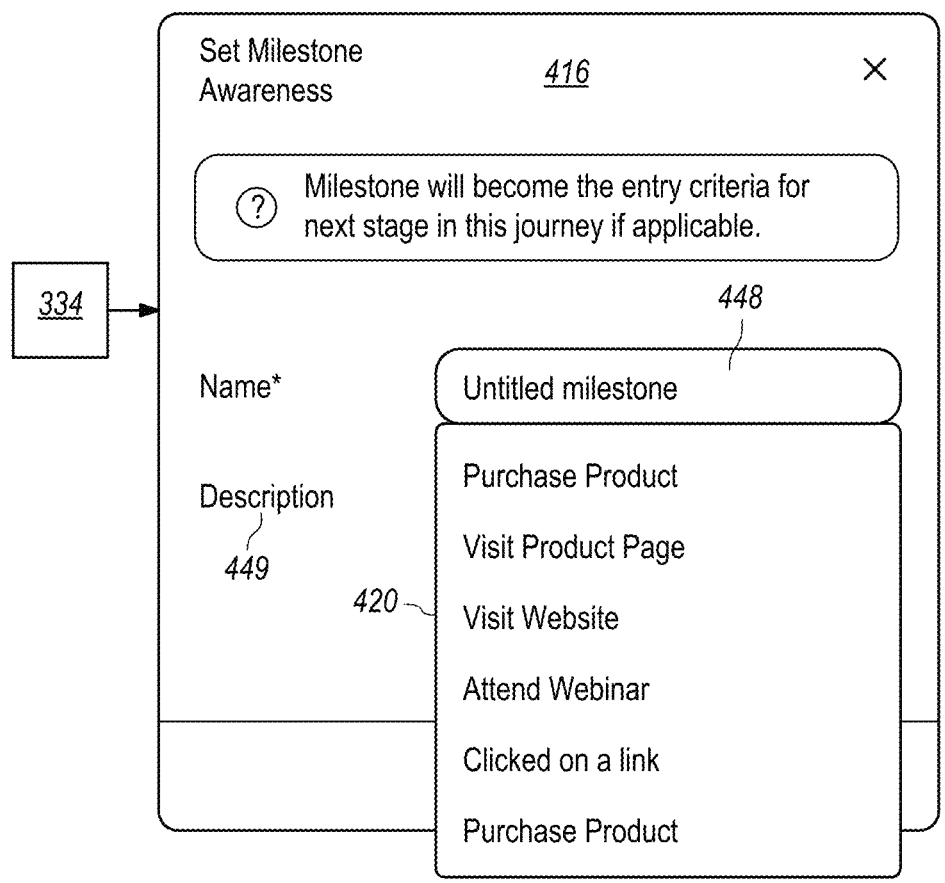
FIG. 4C illustrates an example graphical user interface that is programmed to receive input to specify a milestone as part of an element of a visual journey definition.

At any point, input from user computer 102 to select the milestone control 334 can add a milestone to a journey stage shown in any of the stage panels 324, 326, 328; milestones are described further in other sections herein, for example, with FIG. 4C. Similarly, at any point, input from user computer 102 to select the exit control 336 can add an exit criterion to a journey stage shown in any of the stage panels 324, 326, 328. An exit criterion completes a journey stage and is described further in other sections herein.

At any point, input from user computer 102 to select the goal control 338 causes transmitting a request to the application server instance 106A, which responds with presentation instructions that can render a goal panel to receive input to define a goal in association with a journey stage shown in any of the stage panels 324, 326, 328. FIG. 3C illustrates an example graphical user interface that is programmed to receive input to specify a Goal element of a journey. In an embodiment, a goal panel 340 comprises a name field 342 and a description field 344. Input from user computer 102 can specify a goal name in the name field 342 and a description in the description field 344. Input to select a NEXT link 345 causes transmitting a request to the application server instance 106A to update a journey record to add the name and description to goal column attributes of the journey record.

Referring again to FIG. 3B, in an embodiment, when stages are first created, each stage comprises a first icon 332 that is denoted an undefined entry criterion, as shown for the Awareness stage of stage panel 324. Input from user computer 102 can specify, in a separate entry criteria panel or page, specific entry criteria and in response, causes updating a label of the first icon 332 to "Entry Criteria" rather than "undefined," as shown for the Consideration stage of stage panel 326. FIG. 3F illustrates an example graphical user interface that is programmed to receive input to specify criteria that establish Awareness as part of a journey. In an embodiment, an entry criteria panel 366 comprises a name field 368 and a description widget 370. The name field 368 can be programmed as a text entry widget to receive a text label or name. The description widget 370 can be programmed as a pull-down menu having a plurality of predefined descriptions, categories, or criteria. Examples of entry criteria include purchase product, visit product page, visit website, attend webinar, clicker on a link, and purchase a particular product. Each of the entry criteria corresponds to an action of the user computer 102, a user account, or a user that could be reflected in the data repository 116.

In an embodiment, icons representing entry criteria, milestones, exit criteria, and certain other nodes of a stage can be associated with digitally stored, programmed rules that govern what specific data in the data repository 116 matches the entry criteria or other node. FIG. 3D illustrates an example graphical user interface that is programmed to receive input to specify a Purchase element of a journey. In the example of FIG. 3D, a GUI panel 350 is programmed to receive selections of attributes, behaviors, and other rules. For example, GUI panel 350 can receive input to specify one or more rule sets and rules. A rule set panel 352 displays data relating to one or more rules. In the example of FIG. 3D, rule set panel 352 defines a single rule to determine whether data indicates a product was purchased. A filter set 358 comprises a filter 360 specifying that a checkout_event is true; further, criteria 362 programs the rule to require at least one such event within a 30-day period.

Other rules can be added to the node or criteria via input from a user computer 102 to select an empty rule set panel 354 or by selecting, dragging, and dropping a predefined rule from a rule panel (FIG. 3E) to the empty rule set panel. In an embodiment, completing a rule causes the application server instance 106A to apply the rule to profile data in the profiles database 114 and return a count of total profiles that match the rule. Input from a user computer 102 to select a REFRESH link 364 causes submitting a request to the application server instance 106A to apply the rule to the profile data and return an updated count of total profiles that match the rule and to automatically update the GUI panel 350 to display the updated count. Each completed rule can be stored in data repository 116.

Figure 3E:
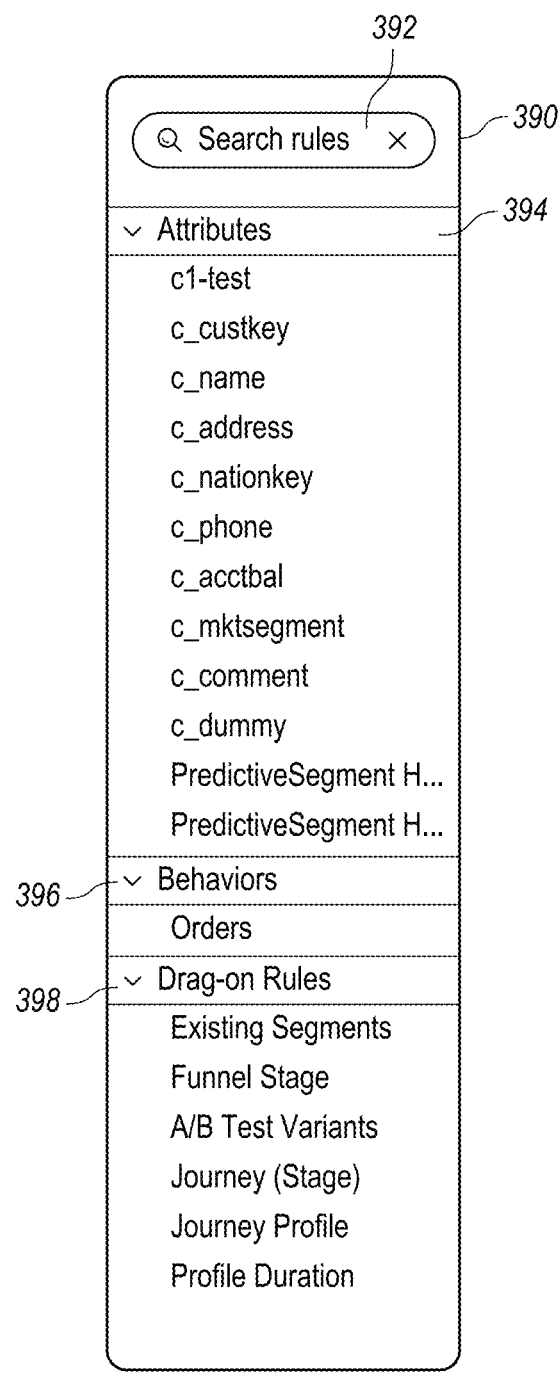
FIG. 3E illustrates an example graphical user interface for a rule panel that is programmed to receive selections of attributes, behaviors, and other rules.

Embodiments can be executed to result in creating and storing large numbers of rules. In an embodiment, a GUI window that includes the virtual canvas of FIG. 3A also can comprise a graphical rule panel that provides visual means of selecting a rule from among a large number of stored rules. FIG. 3E illustrates an example graphical user interface for a rule panel that is programmed to receive selections of attributes, behaviors, and other rules. In an embodiment, a rule panel 390 comprises a search field 392 and a plurality of category bars such as attributes bar 394, behavior bar 396, and drag-on rules bar 398. In an embodiment, each of the category bars is programmed as an expandable and collapsible widget with toggling action such that selecting a category bar alternatively causes items under the bar to expand and become visible or collapse and become invisible. In an embodiment, the drag-on rules bar 398 specifies one or more rules that can be selected, dragged, and dropped to an empty rule set panel 354 (FIG. 3D).

FIG. 3G illustrates an example graphical user interface that is programmed to receive input to specify a plurality of rule sets and rules that establish Awareness as part of a journey. FIG. 3G can be displayed by selecting a journey stage denoted Awareness, for example. In an embodiment, FIG. 3G has the same general configuration as FIG. 3D, but includes two different rule sets as seen with rule set panel 352 and rule set 356. In an embodiment, the first rule set of rule set panel 352, denoted "1." has a rule 372 that defines when website page views occur. A single filter 374 specifies that if a URL is "treasurebikes.com," and at least one URL has appeared in data of the data repository 116 within 30 days, then the rule is satisfied. A second rule set 356 denoted "2." specifies a first rule denoted "A" and defines when a product is purchased in a format similar to that described previously for FIG. 3A, and includes a second rule denoted "B" specifying when a credit card was used.

In an embodiment, when input from user computer 102 specifies two or more rules in a rule set, the GUI panel 350 is programmed to update automatically to display a match logic widget 380 in association with the two or more rules. The match logic widget 380 can be programmed as a pull-down list having predetermined options to specify how the two or more rules should be logically combined to determine whether the rule set is satisfied as a whole based on data in data repository 116. Similarly, when two or more rule sets have been associated with a stage or icon, a second, separate match logic widget 378 is displayed in association with the two or more rule sets. The match logic widget 378 also can be programmed as a pull-down list having predetermined options to specify how the two or more rule sets should be logically combined to determine whether the stage or icon is satisfied.

FIG. 3H illustrates an example graphical user interface that is programmed to receive input to specify elements of match logic. In an embodiment, a match logic panel comprises a logic widget 378 and a value widget 382. The logic widget 378 can be programmed as a pull-down menu listing predefined logic operators. The value widget 382 can be programmed as a text field to receive a statement of values and operators of a Boolean logical statement. Operators can specify simple Boolean relationships such as ALL or AND, ANY or OR, or ADVANCED. The ADVANCED operator can specify relationships among three or more rules or rule sets. After selection using a match logic widget, the data repository 116 is updated to associate values defining the match logic with each of the rules and/or rule sets. Thereafter, at runtime, evaluation or inferences based on data in the data repository 116 and profile data of the profiles database 114 include, account for or execute each of the match logic items that are associated with the rules and rule sets.

FIG. 4A illustrates an example graphical user interface that is programmed to receive input to define exit criteria. In an embodiment, input from user computer 102 to select the exit control 336 causes generating and displaying a GUI window 402 that is configured to accept input to specify one or more exit criteria which, if satisfied in the data of data repository 116, would cause exiting an associated stage of a journey. In the example of FIG. 4A, two (2) exit criteria 404, 408 have been created via two successive instances of input to an ADD link 412. The first exit criterion among the exit criteria 404 specifies that an exit should occur when data indicates stale profiles for 60 days. The second exit criterion among the exit criteria 408 specifies that an exit should occur if data indicates that a customer or user has opted out of certain marketing communications. Selecting a SAVE link causes the application server instance 106A to save the exit criteria as part of a journey record in association with a previously specified exit criteria icon.

FIG. 4B illustrates an example graphical user interface showing visual elements of an Awareness portion of a visual journey definition. FIG. 4B represents an example in which a first stage panel 324 (FIG. 3A) has been updated via input from user computer 102 to drag and drop icons representing a website visit, an undefined activation, and undefined wait steps as seen for icons 332. The stage panel 324 can be programmed to respond to a selection of any undefined icon by returning an updated window or panel that accepts input to define the item represented in the icon. The example of FIG. 4B further comprises a milestone control 334 as previously described an exit control 414 that includes a count value of "2" to indicate that the two exit criteria of FIG. 4A have been created and saved. In an embodiment, selecting the exit control 414 causes the application server instance 106A to regenerate the GUI window 402 of FIG. 4A and to logically return the user computer 102 to that window to accept other input to review or define exit criteria.

FIG. 4C illustrates an example graphical user interface that is programmed to receive input to specify a milestone as part of an element of a visual journey definition. In one embodiment, input from user computer 102 to select a milestone control 334 causes the application server instance 106A to generate presentation instructions which, when rendered at the user computer, cause displaying a milestone panel 416. In an embodiment, the milestone panel 416 comprises a name field 448 and a description widget 420. The name field 448 can be programmed as a text entry widget to receive a text label or name. The description widget 420 can be programmed as a pull-down menu having a plurality of predefined descriptions, categories, or criteria. Examples of entry criteria include purchase product, visit product page, visit website, attend webinar, clicker on a link, and purchase a particular product. Each of the milestone criteria corresponds to an action of the user computer 102, a user account, or a user that could be reflected in data repository 116 and which, when detected at a runtime stage, inference stage, or data evaluation stage, indicates that the milestone is satisfied.

Figure 4D:
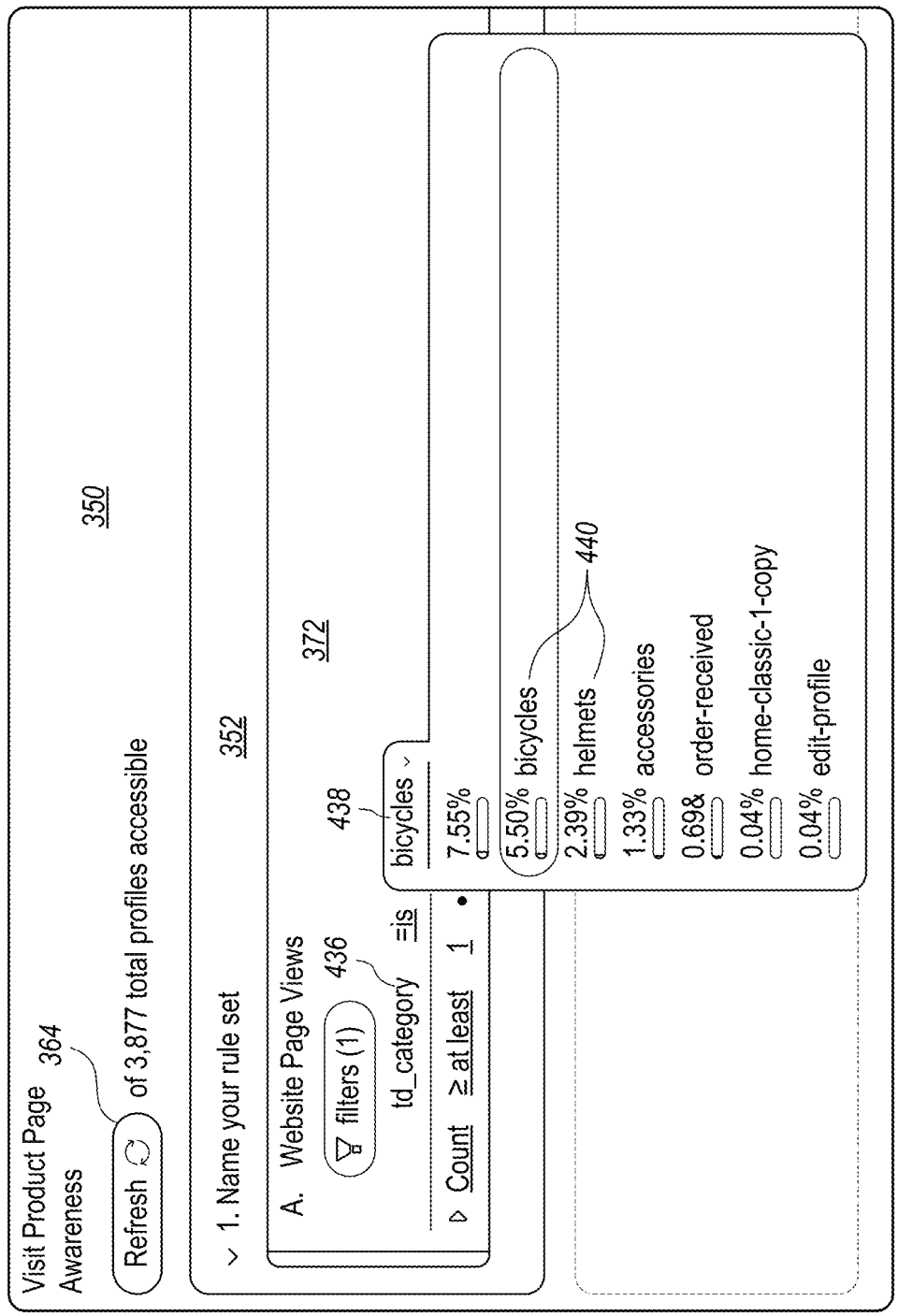
FIG. 4D illustrates an example graphical user interface that is programmed to receive input to specify a term of a rule.

FIG. 4D illustrates an example graphical user interface that is programmed to receive input to specify a term of a rule. The example of FIG. 4D shows another form of a rule set 432 in which a first rule 434, denoted "A" is satisfied when website page views of products in a specified category occur in the data of data repository 116. In an embodiment, input from the user computer 102 can specify the first rule 434 using a category attribute, an operator, and a category value. For FIG. 4D, the category attribute is "td category" and the operator is "=is".

In an embodiment, the presentation instructions that render the window of FIG. 4D are programmed to accept a category value 438 using a dynamic widget. Input from a user computer 102 to select the category value 438 causes the page of FIG. 4D to generate and transmit to application server instance 106A a request to query the data repository 116 to return a result set of values that are actually represented in the data repository as categories of products that users previously browsed, with counts of website page views for each of the categories of products. In response to receiving the result set, the application server instance 106A is programmed to calculate a total count of page views for all category values and to determine a percentage of the total for each category, and to return presentation instructions that are formatted to render the category values and corresponding percentage values in a list associated with the category value 438. For example, categories 440 include category values "bicycles" and "helmets" in association with calculated percentage values "5.50%" and "2.39%," to indicate that data in data repository 116 shows that 5.50% of all website page views showed bicycle products and 2.39% showed helmets. With this approach, selecting the category value 438 enables the user computer 102 to immediately receive a preview of the magnitude of matches that can be expected from the data then-currently stored in data repository 116. The application server instance 106A queries, receives, calculates, and returns presentation instructions for the preview data in real-time in response to a selection of the category value 438, thereby enabling generally rapid to instant previews of the likely usefulness of particular values of the category value 438.

Figure 5A:
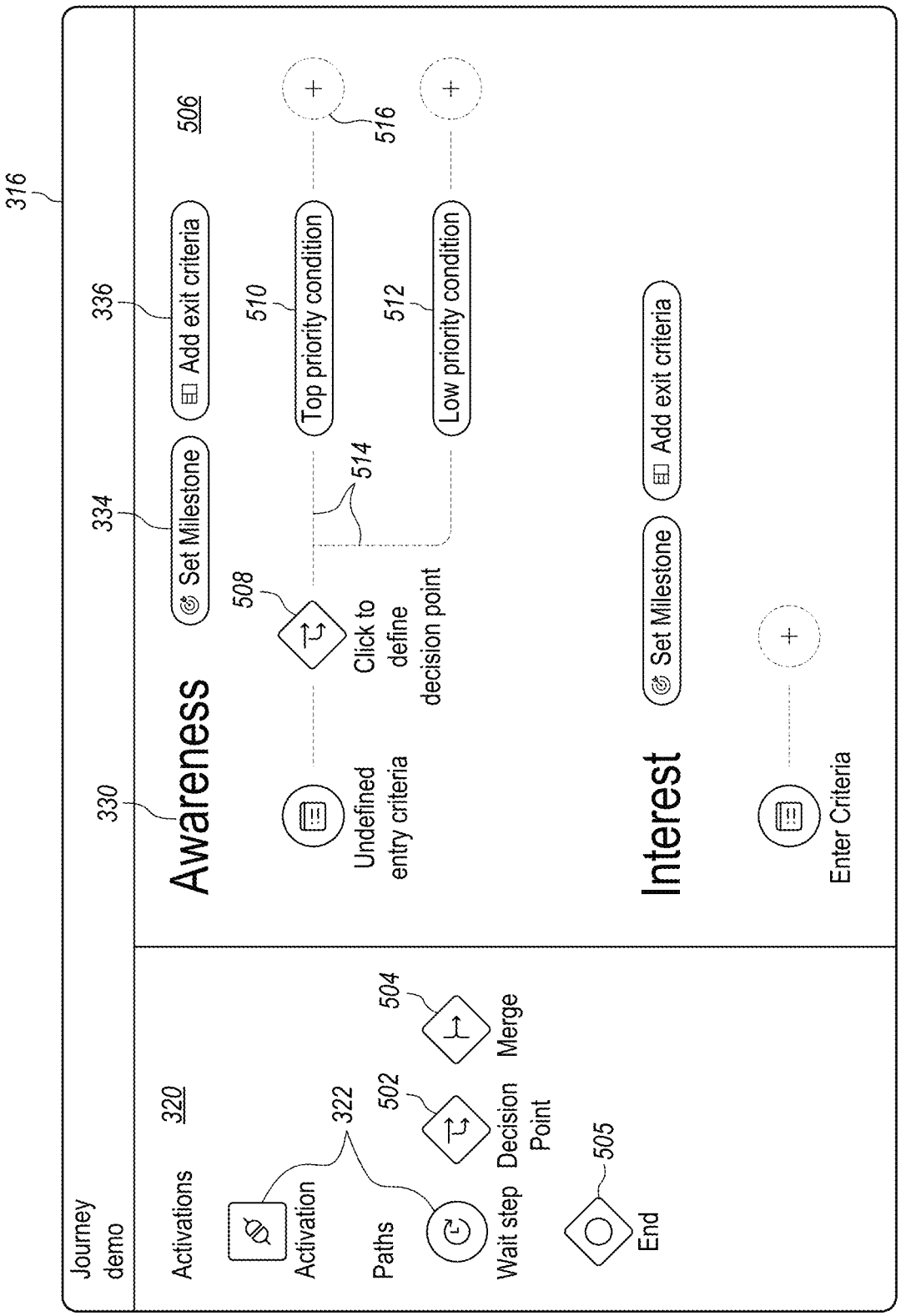
FIG. 5A illustrates an example graphical user interface showing a virtual canvas comprising a visual journey definition and a palette of graphical symbols that can be used in the virtual canvas.

FIG. 5A illustrates an example graphical user interface showing a virtual canvas comprising a visual journey definition and a palette of graphical symbols that can be used in the virtual canvas. The example of FIG. 5A shows the palette 320 (FIG. 3A) displayed in association with a virtual canvas 506 in which an Awareness stage and Interest stage are being defined. In palette 320, a plurality of icons 322 can receive input from user computer 102 to drag and drop copies of the icons in the virtual canvas 506 to define stages of journeys. Examples of icons in the plurality of icons 322 can represent an activation or a wait step. A decision point icon 502 can represent an action that directs branching to a first branch or a second branch of the journey segment, depending on the outcome of the action. A merge icon 504 can represent a rejoining of two branches in response to one or more merge criteria.

For example, in virtual canvas 506, an Awareness stage comprises a first icon specifying undefined entry criteria, followed serially by a decision point icon 508 having branches 514 leading on a first branch to a top priority condition 510 and on a second branch to a low priority condition 512. In an embodiment, input from the user computer 102 to select the top priority condition 510 causes the application server instance 106A to generate presentation instructions which, when rendered, cause displaying a pop-up dialog box to set a condition for the top priority condition and can accept a name and description of the condition. A rule set editor having a display like FIG. 3E can be accessed and used to select from among attributes, behaviors, and drag-on rules; closing the rule set editor causes adding the selected attributes, behaviors, and/or drag-on rules to the top priority condition 510. The same process can be used for the low priority condition 512. In an embodiment, when a decision point icon 502 is dragged from palette 320 to the virtual canvas 506, in the position of decision point icon 508, the application server instance 106A is programmed to display two branches 514 by default, but other input from user computer 102 can specify a different number of branches, such as three or four. If three or four are selected, then in response, the virtual canvas 506 updates to show a first condition, a second condition, and one or more new low-priority conditions; any of the conditions can be selected with rules added using the same process as described above. Or, a decision point can be edited to reduce the number of conditions, which causes deleting the most recent conditions that were added in order of time or recency. Other icons can be added to either branch by input from user computer 102 to drag a copy of an icon from palette 320 to a terminal icon 516 at the end of each branch.

Figure 5B:
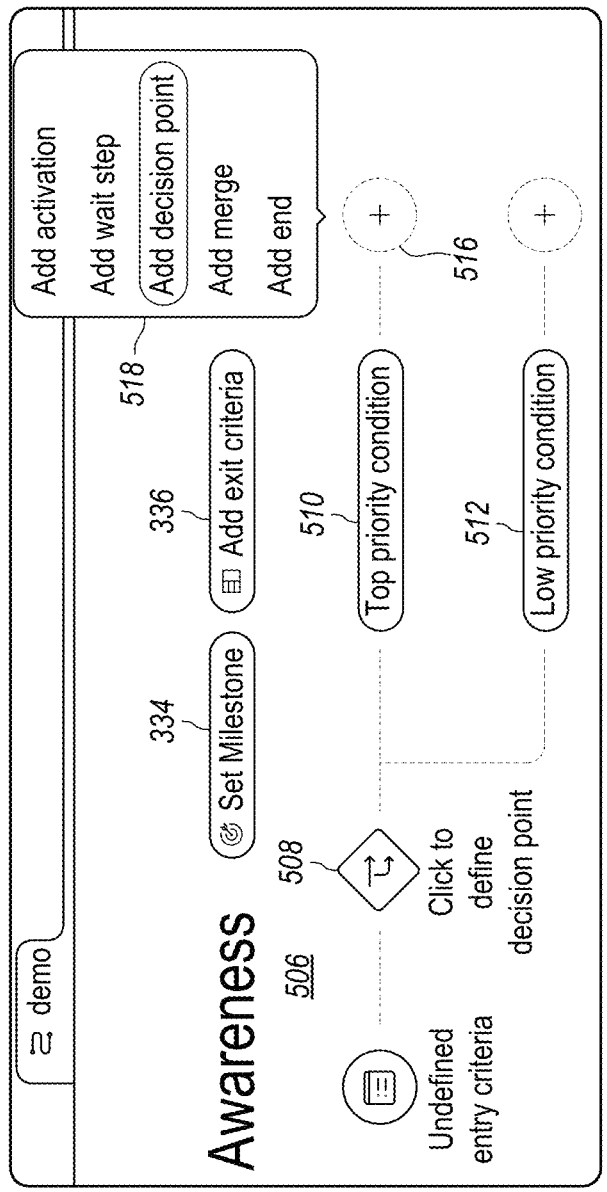
FIG. 5B illustrates an example graphical user interface that is programmed to receive input to graphically add a visual element to a visual journey definition.

FIG. 5B illustrates an example graphical user interface that is programmed to receive input to graphically add a visual element to a visual journey definition. In an embodiment, selecting the terminal icon 516 at the end of a visual journey stage or branch, as in FIG. 5A causes generating and displaying an add panel 518, which can be programmed as a pull-down menu or other list of predefined function options. In one embodiment, the function options are add activation, add wait step, add decision point, add merge, and add end. Selecting one of the function options from add panel causes updating a stage or branch to show an icon of the plurality of icons 322 corresponding to the selected function icon in the position of the terminal icon 516, which is redisplayed laterally to the right or otherwise near the newly added icon. In this manner, an activation, wait step, decision point, merge, or end can be added to the visual representation of a branch or stage of a customer journey, in the virtual canvas, without a drag-and-drop interaction with the palette. In some embodiments, the add panel 518 can be accessed by right-clicking on the terminal icon 516 or another element of a branch or stage.

Figure 5C:
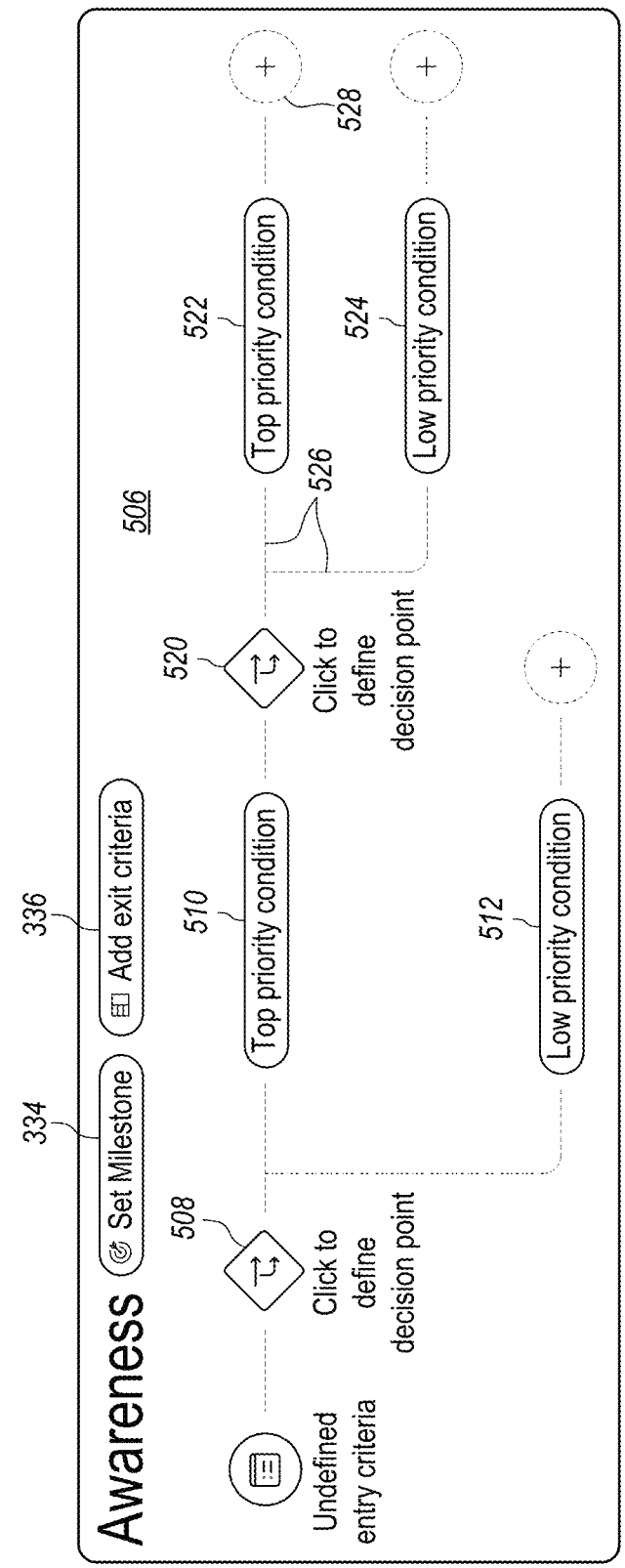
FIG. 5C illustrates an example graphical user interface showing visual elements of an Awareness portion of a visual journey definition having multiple branches.

In the add panel 518 of FIG. 5B, the "add decision point" function option is shown selected as an example. FIG. 5C illustrates an example graphical user interface showing visual elements of an Awareness portion of a visual journey definition having multiple branches. The example of FIG. 5C can be generated and displayed in response to selecting the "add decision point" function option in add panel 518. When "add decision point" is selected, application server instance 106A is programmed to update the virtual canvas 506 to add a decision point icon 508, 520, at a position that had been selected at the time of selecting the function. Thus, a decision point icon will be inserted visually in the virtual canvas, serially in the flow of other icons, at the positions shown for icon 508 or icon 520 depending on the position of editing or a selection at the time of insertion. In an embodiment, adding a decision point icon causes adding the decision point icon 508, 520 in an undefined state; further input from user computer 102 can select the decision point icon 508, 520 to provide definition parameters and change the state to a defined state.

Furthermore, in an embodiment, adding a decision point icon to the virtual canvas automatically causes creating and displaying two branches, such as branches 526 for decision point icon 520. Each of the branches 526 is associated with a top priority condition 522 and a low priority condition 524. The decision point icon 508 is associated with a top priority condition 510 and a low priority condition 512. Branching conditions, to determine which condition is satisfied based on data in the data repository 116, can be defined in metadata associated with a decision point icon 508, 520.

Figure 5D:
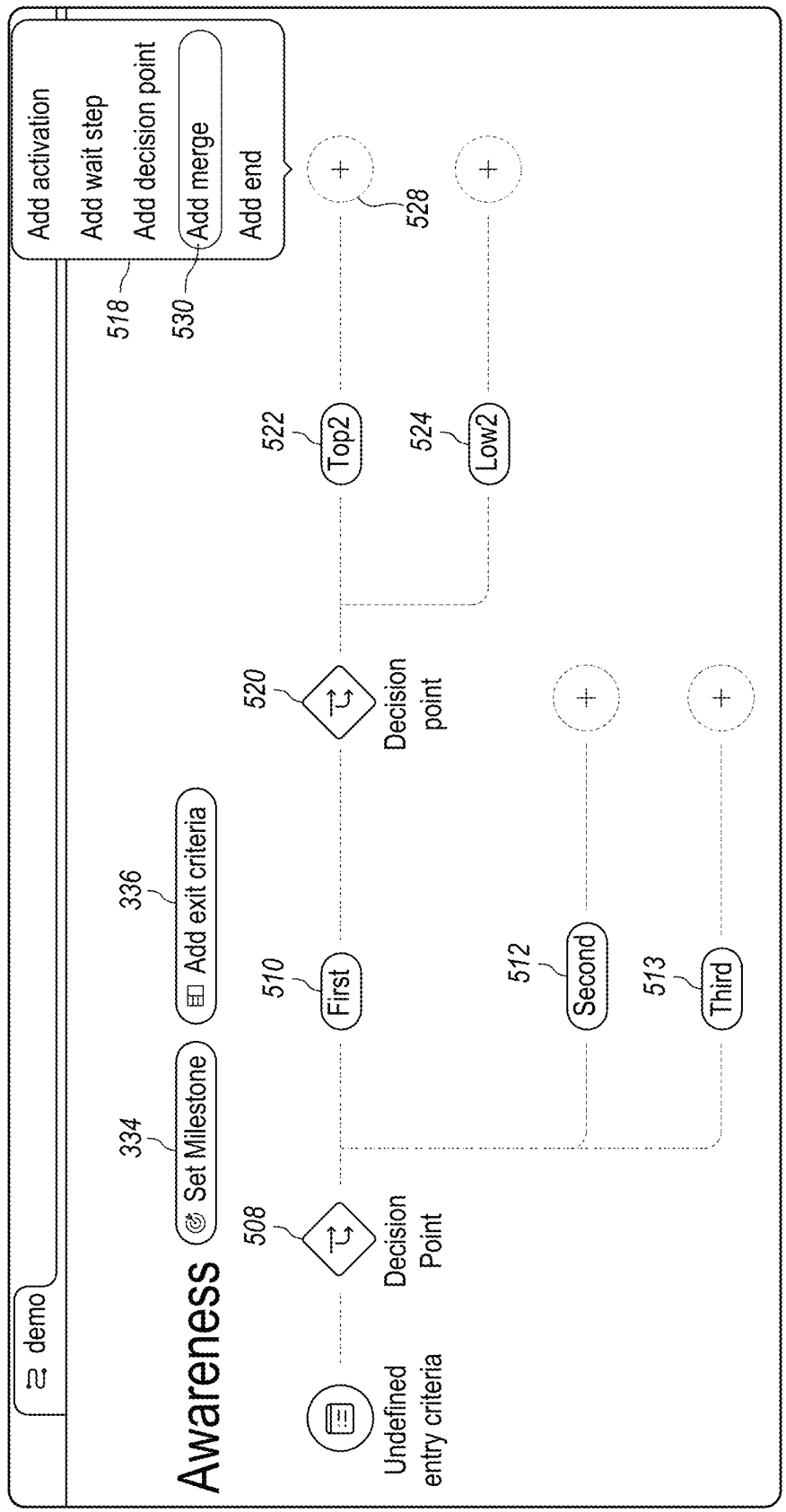
FIG. 5D illustrates an example graphical user interface showing visual elements of an Awareness portion of a visual journey definition having multiple branches and undergoing a brand merge operation.

FIG. 5D illustrates an example graphical user interface showing visual elements of an Awareness portion of a visual journey definition having multiple branches and undergoing a brand merge operation. FIG. 5D shows the same sets of icons as in FIG. 5C; however, in FIG. 5D, the decision point icons 508, 520 are in the defined states. Further, conditions 510, 512, 522, 524 have been named, and a third branch has been added to decision point icon 508. In an embodiment, a decision point icon can have any number of branches. In the example of FIG. 5D, input from user computer 102 has selected a terminal icon 528, and in response, application server instance 106A is programmed to display the add panel 518; an "add merge" function has been selected via input from the user computer. The "add merge" function can be used to combine or merge two branches at a merge point.

Figure 5E:
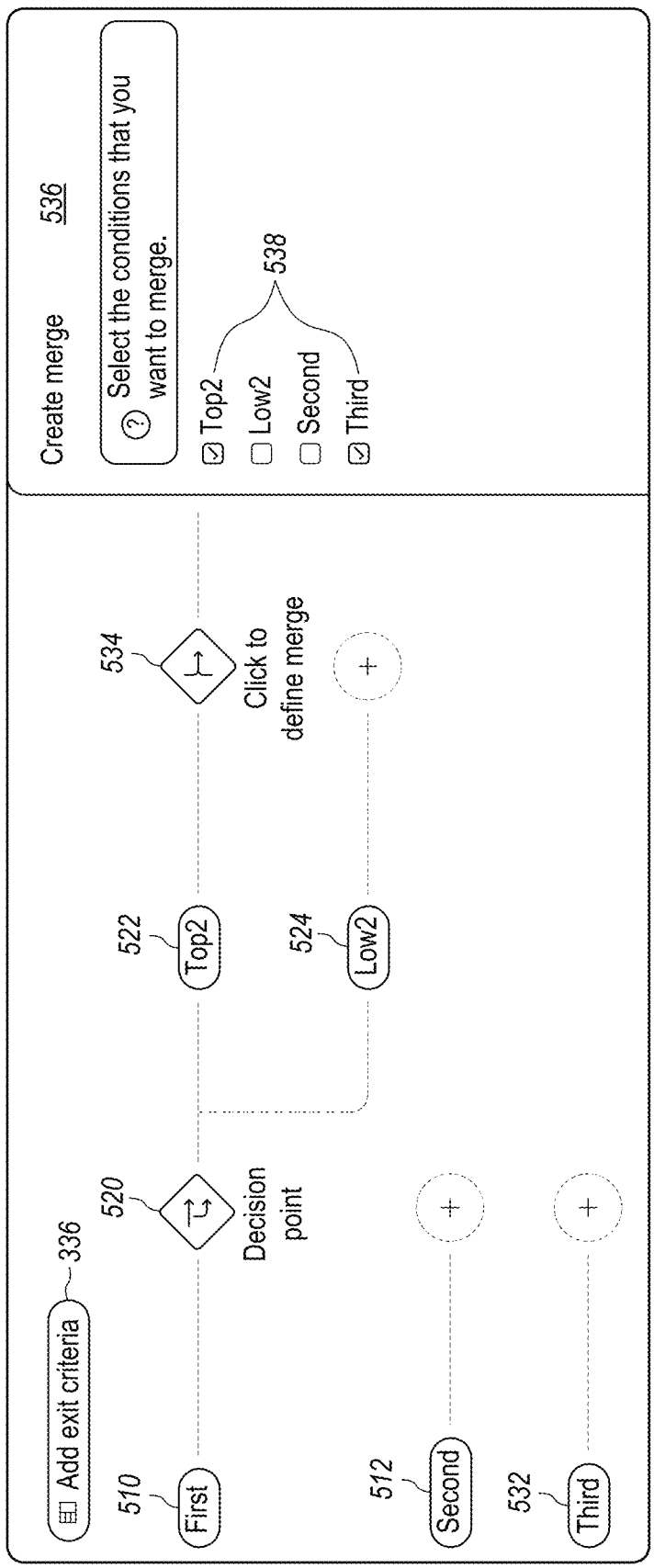
FIG. 5E illustrates an example graphical user interface showing visual elements of an Awareness portion of a visual journey definition having multiple branches and undergoing a brand merge operation.

FIG. 5E illustrates an example graphical user interface showing visual elements of an Awareness portion of a visual journey definition having multiple branches and undergoing a brand merge operation. FIG. 5E can represent the state of the virtual canvas of FIG. 5C, FIG. 5D after the "add merge" function is selected and shows conditions 510, 512, 532 that are associated with a first decision point, as well as a second decision point and conditions 522, 524. In response to the "add merge" function selection of FIG. 5D, application server instance 106A is programmed to display a merge icon 534 at a selected point or editing point, and to generate and transmit presentation instructions to display a "create merge" dialog panel 536. Input from user computer 102 can specify the conditions to merge via merge icon 534. In an embodiment, the dialog panel 536 automatically displays two or more condition widgets 538 that are programmed to accept input to select one or more of the condition widgets. Each of the condition widgets is displayed automatically using the same display name as the conditions of the virtual canvas that are in the defined state. For example, condition 522 is named "Top2" and has a corresponding condition widget 538 in dialog panel 536 with the same name, as does the "Low2" condition and the "second" and "third" conditions. The dialog panel 536 also is programmed to show, with condition widgets 538, only conditions that are capable of merging based on the position of the conditions in the virtual canvas. For example, a first condition, like the top priority condition 510 is incapable of merging because a decision point icon follows it.

Figure 5F:
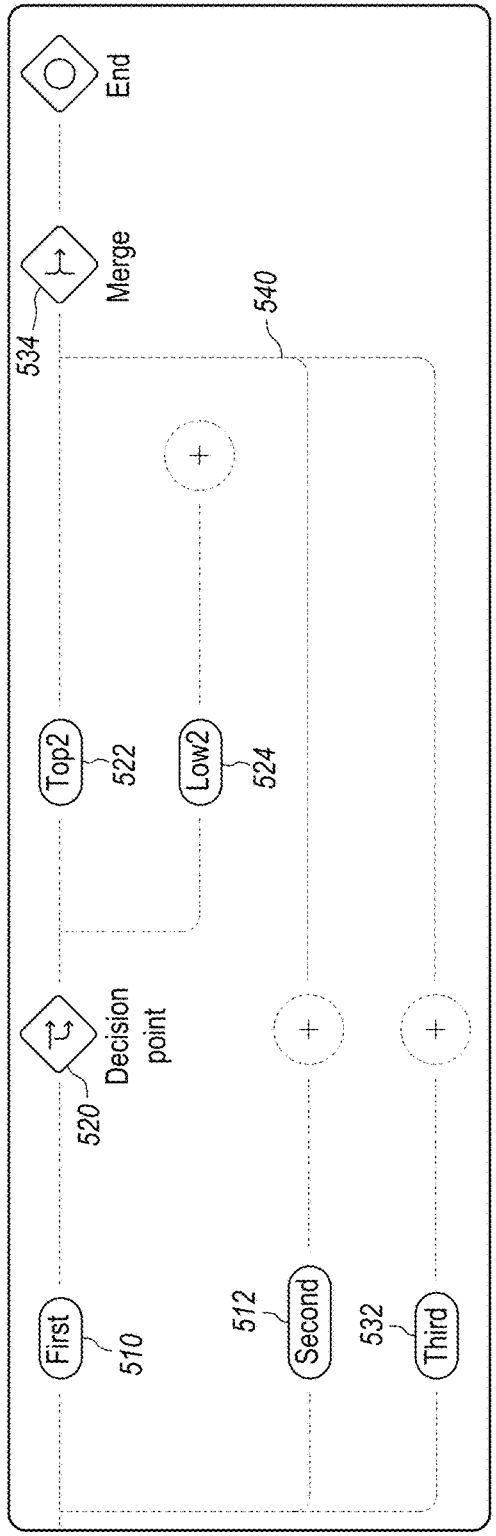
FIG. 5F, FIG. 5G, FIG. 5H illustrate example graphical user interfaces showing visual elements of visual journey definitions with several combinations of branching and merging.
Figure 5G:
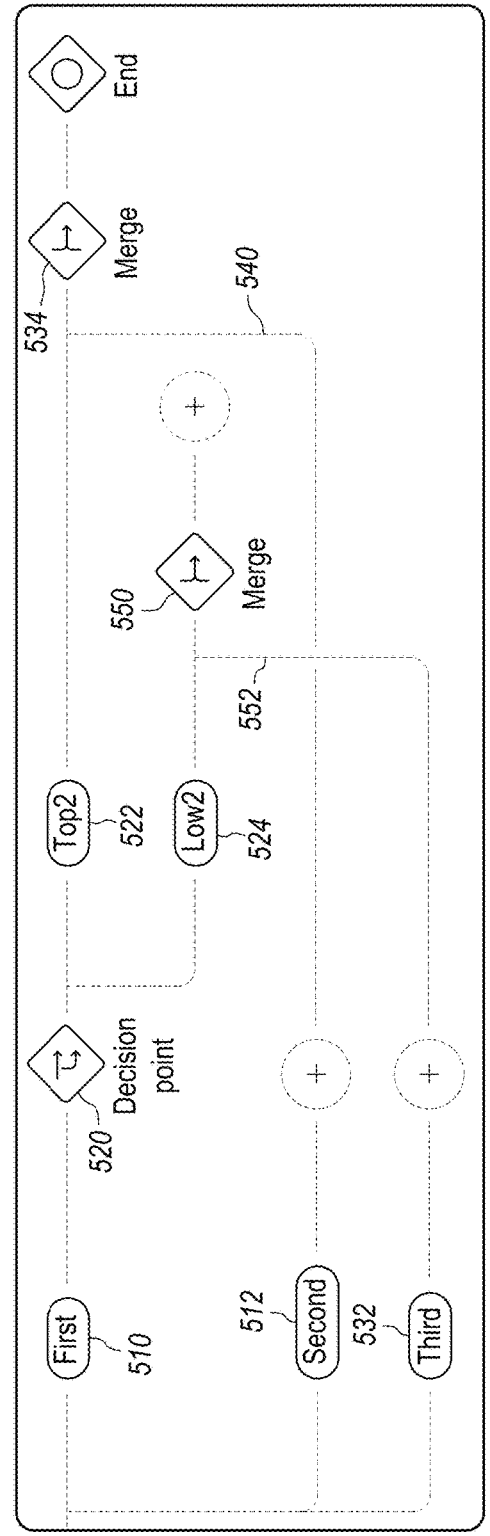
Figure 5H:
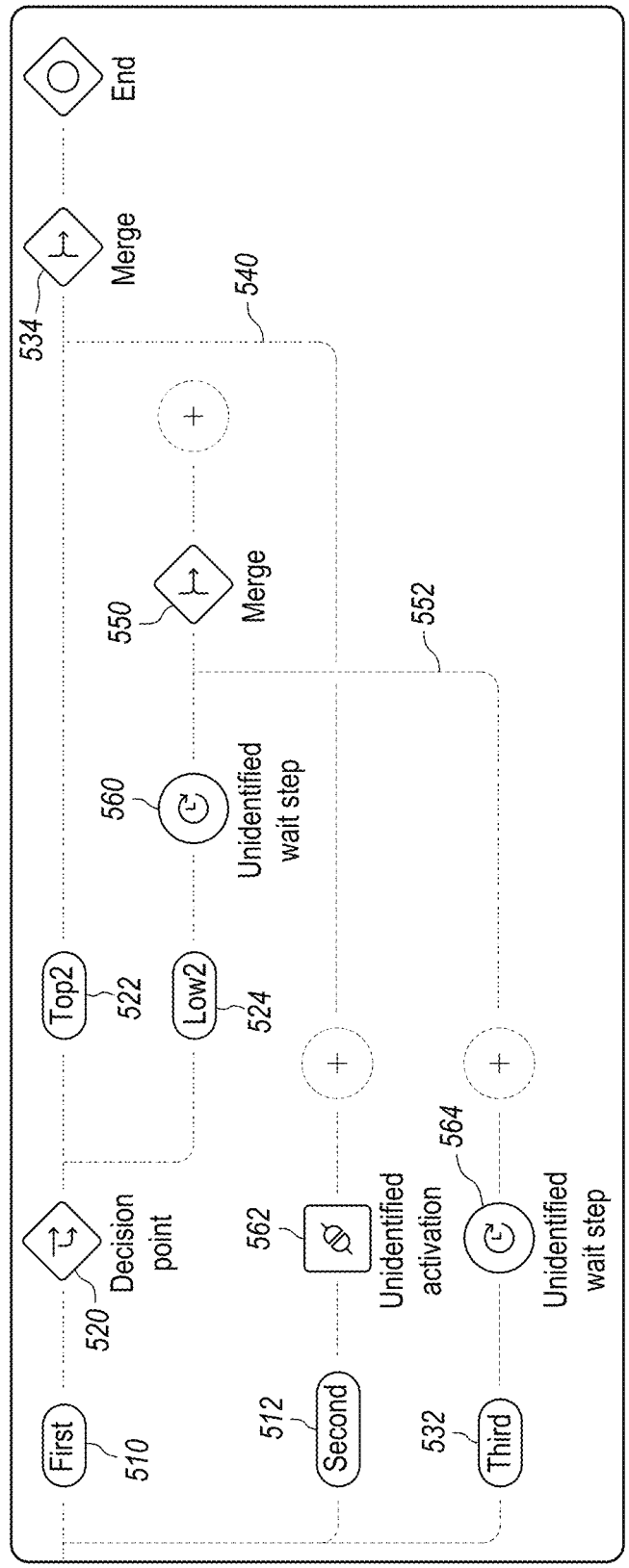

FIG. 5F, FIG. 5G, FIG. 5H illustrate example graphical user interfaces showing visual elements of visual journey definitions with several combinations of branching and merging. Assume that during the display of the elements of FIG. 5E, input from the user computer selects the "Top2," "second," and "third" widgets among condition widgets 538. In response, as seen in FIG. 5F, application server instance 106A is programmed to display a merge icon 534 and branch paths 540 that link the merge icon to the condition icons corresponding to the condition widgets 538 that were selected. Or, assume that using other input, the "add merge" function is selected, followed by condition widgets 538 for the "Low2" condition 524 and "third" condition 532; FIG. 5G shows an updated virtual canvas that would be generated in response, with a second merge icon 550 and branch paths 552, connecting the second merge icon to the selected conditions. FIG. 5H shows a further update in which: a wait step 560 in the unidentified state has been added after the "Low2" condition 524; an activation 562 in the unidentified state has been added after the "second" condition 512; a wait step 564 in the unidentified state has been added after the "third" condition 532. As shown, merge paths can overlap, and other drag-and-drop input from user computer 102 can add an activation or wait step at any intervening point.

Each of these operations causes creating and storing updated attributes and metadata in the journey record in data repository 116 that identify each of the icons, edges that join each icon to other icons, names, and other attributes of icons. For example, a wait step, when identified, is associated with a wait period, such as one hour, several hours, a day, several days, a week, several weeks, etc. That is, the techniques herein do not involve only visual displays, but the creation of persistently stored records of journeys, consisting of data defining the conditions, operations, and branches that are visually shown, and capable of computer-implemented, automatic, real-time evaluation against data stored in data repository 116 representing actual customer or user interactions with devices, servers, applications, websites, or computers, to determine if one or more profiles representing customers or users has completed an action, condition, stage, or journey.

Figure 6:
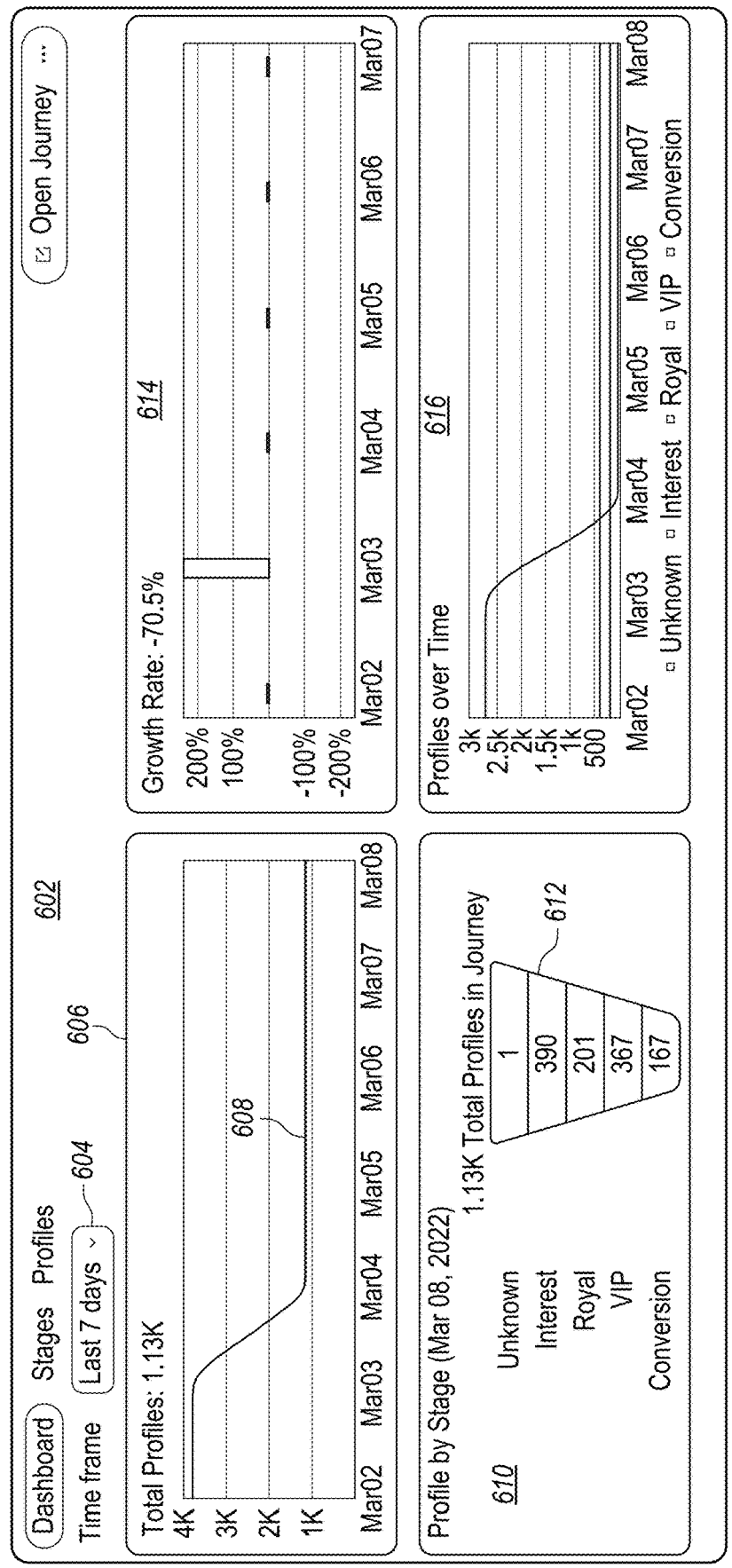
FIG. 6 illustrates an example graphical user interface showing a visual dashboard of the effect of using a visual journey in relation to specific profiles with a funnel display.

FIG. 6 illustrates an example graphical user interface showing a visual dashboard of the effect of using a visual journey in relation to specific profiles with a funnel display. An embodiment can be programmed to display a visual dashboard 602 in response to selecting a Dashboard link from among a plurality of links labeled Dashboard, Stages, Profiles, etc., in a main screen of an application that the application server instances 106A, 106B serve. In an embodiment, the visual dashboard comprises a time frame widget 604, a total profiles panel 606, a stage panel 610, a growth panel 614, and a time panel 616. In an embodiment, the time frame widget 604 is programmed as a pull-down menu that lists a plurality of predefined time periods; input from a user computer 102 to select one of the items in the menu causes an application server instance 106A to recalculate data shown in the visual dashboard 602 using the time period specified in the selected item, and to generate updated presentation instructions to redisplay the visual dashboard to show data for the selected period.

In an embodiment, the total profiles panel 606 comprises a line graph having a line 608 that represents a total count of profiles, from among all profiles in the profiles database 114, that are associated with data matching any of the actions or conditions of a particular customer journey. In an embodiment, the line graph shows such counts for a plurality of discrete periods within the time period specified using widget 604. For example, FIG. 6 shows widget 604 having a selected item of "Last 7 days". The horizontal axis of the graph in total profiles panel 606 identifies seven different days. Other selections of widget 604 would cause the application server instance 106A to display the line graph with different time divisions in the horizontal axis with a different form of the line 608 based on those divisions.

In an embodiment, the stage panel 610 comprises a funnel graph 612 that displays counts of profiles that match each of a plurality of different named stages of a previously created customer journey, having multiple stages, that has been evaluated against profiles in profiles database 114 and user signals or interaction data in data repository 116. In the example of FIG. 6, a customer journey has been defined using the visual techniques previously described with four (4) stages denoted Interest, Royal, VIP, and Conversion, with a system-defined stage of "Unknown" to hold profiles that cannot be classified in one of the other stages. The stage panel 610 has labels corresponding to the named stages, each of the labels being near a corresponding count of profiles for that stage.

In an embodiment, the growth panel 614 comprises a bar chart that displays, for the same periods used in the total profiles panel 606, graphical bars corresponding to rates of growth in total profiles in the period that has been selected using widget 604. In an embodiment, the time panel 616 comprises a line graph that represents counts of total profiles in different stages of the predefined customer journey for the same periods used in the total profiles panel 606.

Figure 7A:
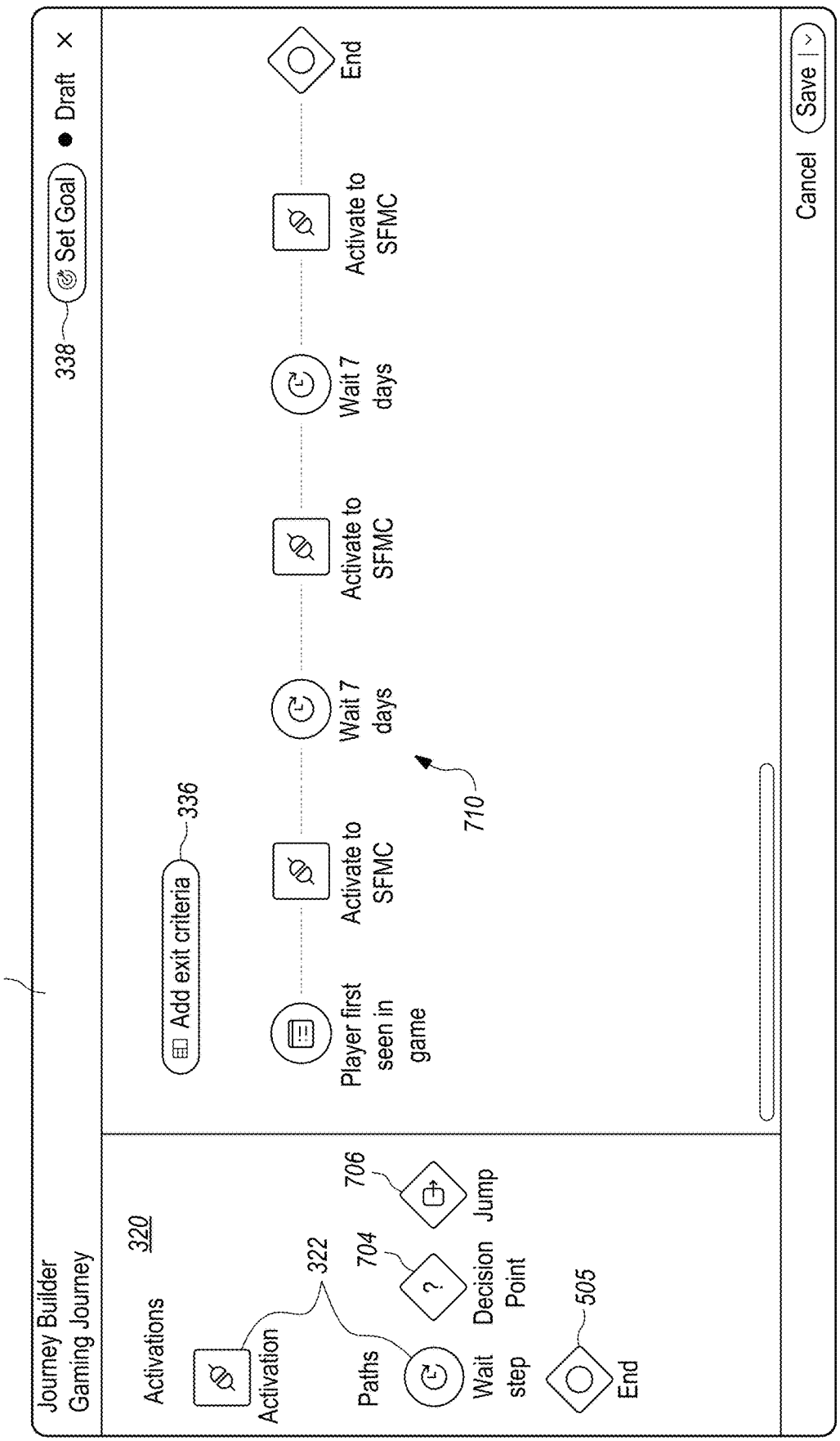
FIG. 7A, FIG. 7B, FIG. 7C illustrate example graphical user interfaces showing several examples of virtual canvas with visual journey definitions, different kinds of activations, branches, and actions in the journey definitions.
Figure 7B:
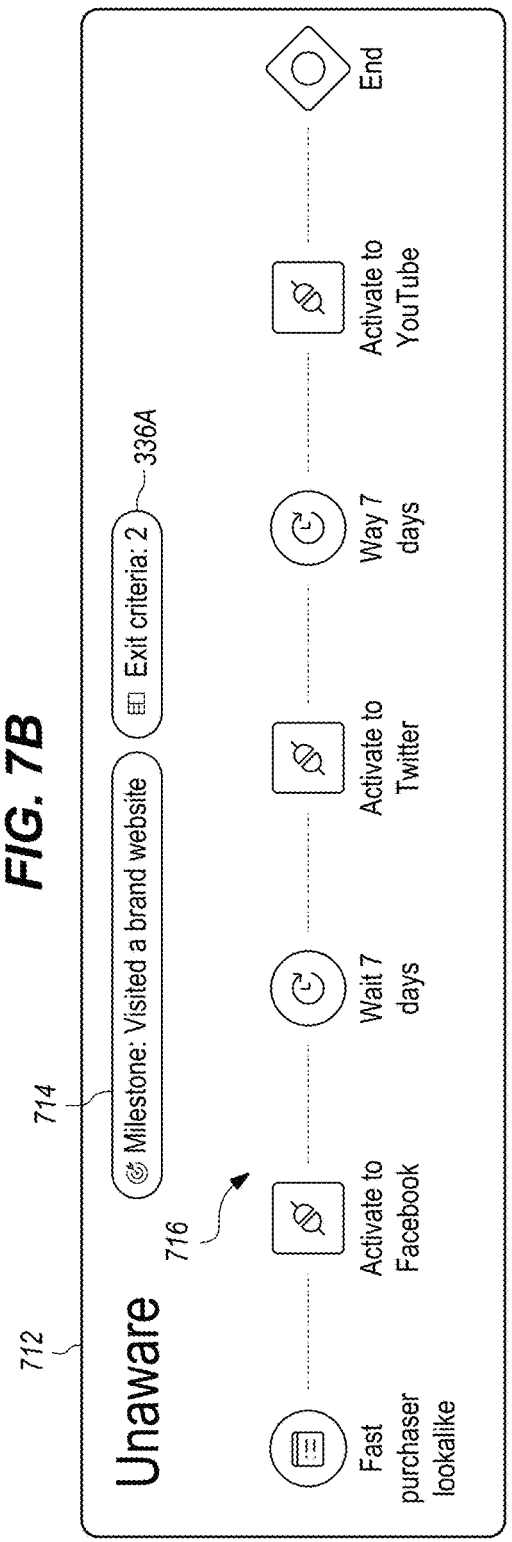
Figure 7C:
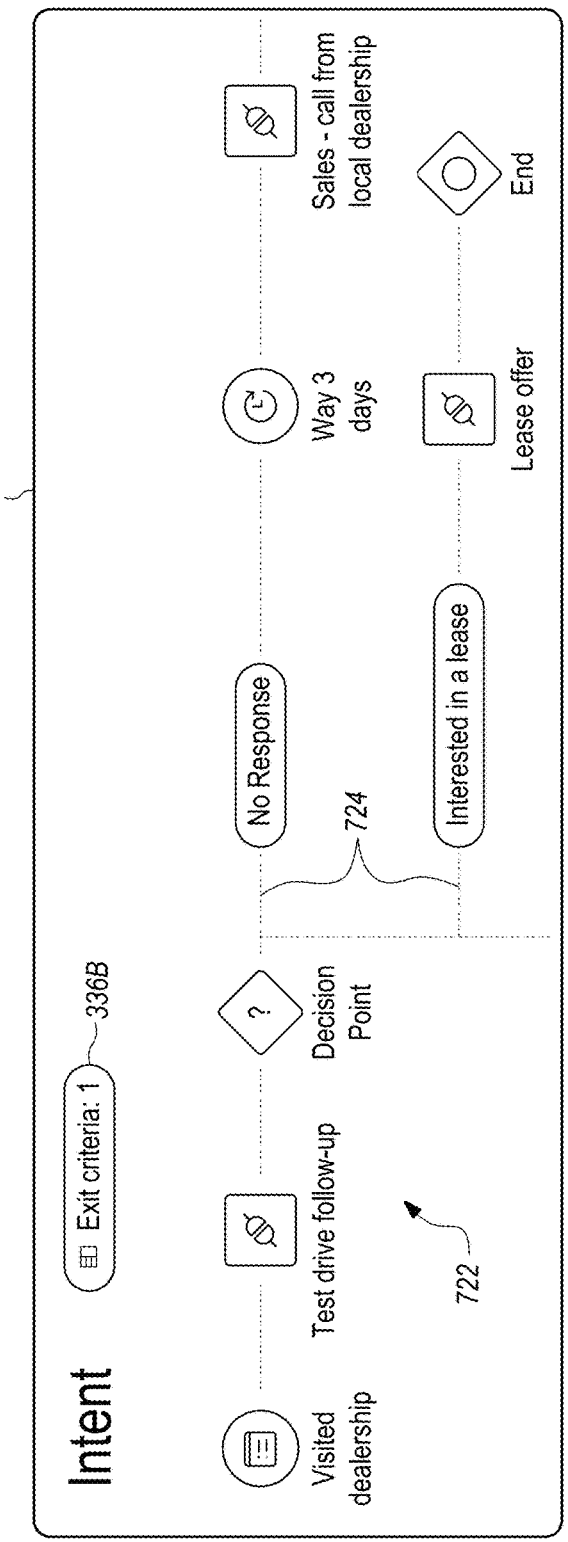

FIG. 7A, FIG. 7B, FIG. 7C illustrate example graphical user interfaces showing several examples of virtual canvas with visual journey definitions, different kinds of activations, branches, and actions in the journey definitions. Referring first to FIG. 7A, in an embodiment, input from the user computer 102 can drag and drop copies of a plurality of icons 322 into a virtual canvas 702 to visually form a single-stage customer journey 710. In the example of FIG. 7A, a first icon specifies entry point criteria that must be matched in data in data repository 116 for a profile to have entered the single stage and the journey; in this example, the data must indicate that a profile corresponding to a player has been first seen in a game. If the data satisfies that criteria, then an activation occurs, followed by a seven-day wait state, a second activation, a second seven-day wait state, and a third activation.

FIG. 7B shows a different example in which a portion of a virtual canvas 712 visually represents a portion of a customer journey of an "Unaware" stage 716. A milestone icon 714, which is defined as "visited a brand website," indicates that stage 716 is entered when data in the data repository 116 shows that profile(s) visited a brand website. An entry icon specifies that if the data matches a "fast purchaser lookalike," then the stage progresses to a first activation to the FACEBOOK service, followed by a first seven-day wait state, a second activation to the TWITTER service, a second seven-day wait state, and a third activation to the YOUTUBE service.

FIG. 7C shows a further example in which a portion of a virtual canvas 720 represents an INTENT stage having one defined exit criteria. The example of FIG. 7C could be useful for profiles and data in data repository 116 relating to the use of an online motor vehicle dealership. An entry icon of journey stage 722 specifies entry criteria that are satisfied if data indicates that profile(s) visited a dealership. A test drive follow-up action occurs next, followed by a decision point with branches 724. If the data in data repository 116 shows profile(s) that received a test drive follow-up but did not respond, then in the top branch 724, a three-day wait state occurs, followed by a sales call from a local dealership. The lower branch 724 indicates that data shows profile(s) interested in a lease, so a lease offer follows.

3. IMPLEMENTATION EXAMPLE—HARDWARE OVERVIEW

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 8:
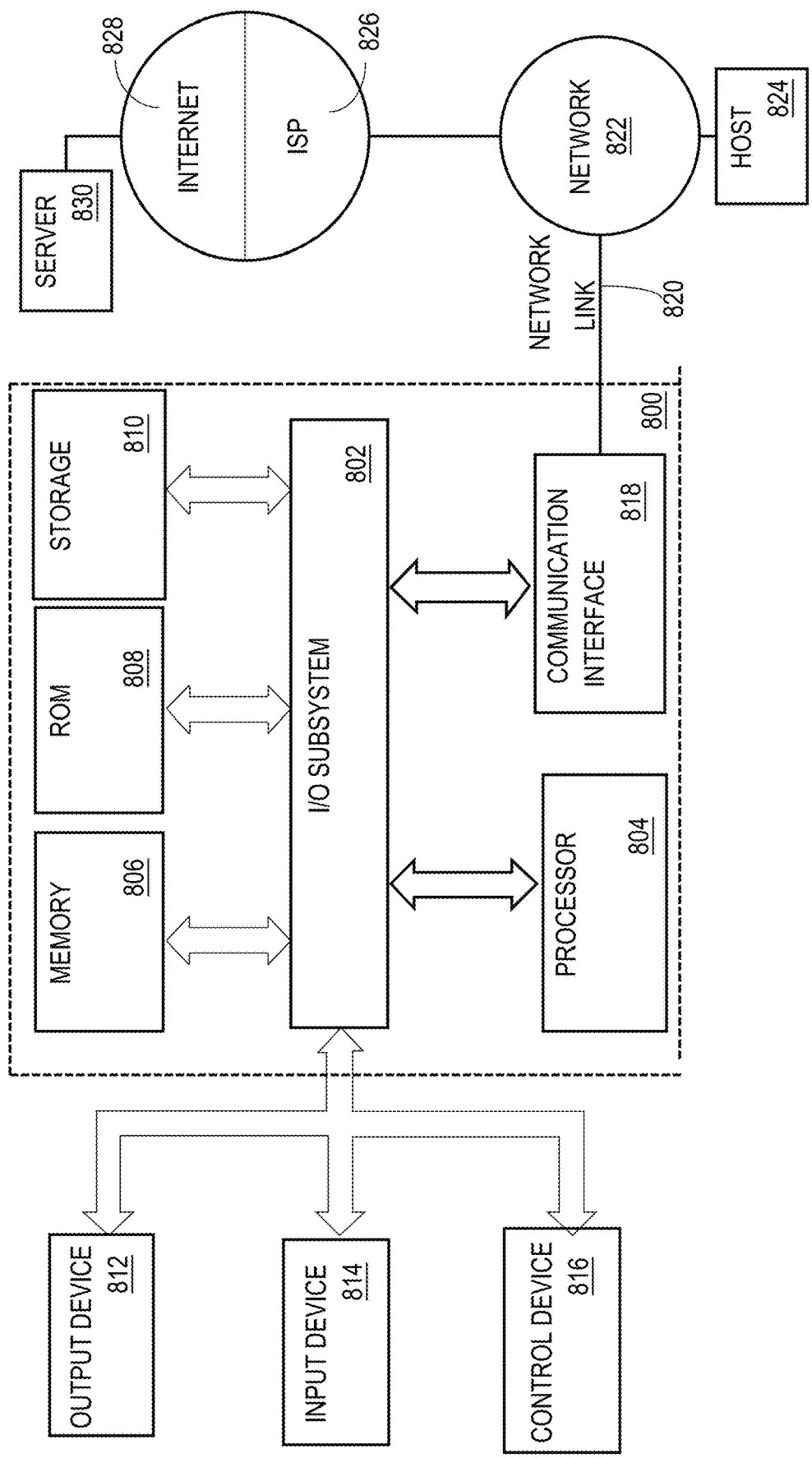
FIG. 8 illustrates a computer system with which one embodiment could be implemented.

FIG. 8 is a block diagram that illustrates an example computer system with which an embodiment may be implemented. In the example of FIG. 8, a computer system 800 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 800 includes an input/output (I/O) subsystem 802, which may include a bus and/or other communication mechanism(s) for communicating information and/or instructions between the components of the computer system 800 over electronic signal paths. The I/O subsystem 802 may include an I/O controller, a memory controller, and at least one I/O port. The electronic signal paths are represented schematically in the drawings, for example, as lines, unidirectional arrows, or bidirectional arrows.

At least one hardware processor 804 is coupled to I/O subsystem 802 for processing information and instructions. Hardware processor 804 may include, for example, a general-purpose microprocessor or microcontroller and/or a special-purpose microprocessor such as an embedded system or a graphics processing unit (GPU), or a digital signal processor or ARM processor. Processor 804 may comprise an integrated arithmetic logic unit (ALU) or may be coupled to a separate ALU.

Computer system 800 includes one or more units of memory 806, such as a main memory, which is coupled to I/O subsystem 802 for electronically digitally storing data and instructions to be executed by processor 804. Memory 806 may include volatile memory such as various forms of random-access memory (RAM) or other dynamic storage device. Memory 806 also may be used for storing temporary variables or other intermediate information during the execution of instructions to be executed by processor 804. Such instructions, when stored in non-transitory computer-readable storage media accessible to processor 804, can render computer system 800 into a special-purpose machine that is customized to perform the operations specified in the instructions.

Computer system 800 further includes non-volatile memory such as read only memory (ROM) 808 or other static storage device coupled to I/O subsystem 802 for storing information and instructions for processor 804. The ROM 808 may include various forms of programmable ROM (PROM) such as erasable PROM (EPROM) or electrically erasable PROM (EEPROM). A unit of persistent storage 810 may include various forms of non-volatile RAM (NVRAM), such as FLASH memory, or solid-state storage, magnetic disk or optical disk such as CD-ROM or DVD-ROM and may be coupled to I/O subsystem 802 for storing information and instructions. Storage 810 is an example of a non-transitory computer-readable medium that may be used to store instructions and data which, when executed by processor 804, cause performing computer-implemented methods to execute the techniques herein.

The instructions in memory 806, ROM 808, or storage 810 may comprise one or more sets of instructions that are organized as modules, methods, objects, functions, routines, or calls. The instructions may be organized as one or more computer programs, operating system services, or application programs, including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation layer, application layer, and data storage layer, such as a relational database system using a structured query language (SQL) or no SQL, an object store, a graph database, a flat file system, or other data storage.

Computer system 800 may be coupled via I/O subsystem 802 to at least one output device 812. In one embodiment, output device 812 is a digital computer display. Examples of a display that may be used in various embodiments include a touch screen display or a light-emitting diode (LED) display or a liquid crystal display (LCD) or an e-paper display. Computer system 800 may include other type(s) of output devices 812, alternatively or in addition to a display device. Examples of other output devices 812 include printers, ticket printers, plotters, projectors, sound cards or video cards, speakers, buzzers or piezoelectric devices or other audible devices, lamps or LED or LCD indicators, haptic devices, actuators or servos.

At least one input device 814 is coupled to I/O subsystem 802 for communicating signals, data, command selections or gestures to processor 804. Examples of input devices 814 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 816, which may perform cursor control or other automated control functions such as navigation in a graphical interface on a display screen, alternatively or in addition to input functions. The control device 816 may be a touchpad, a mouse, a trackball, or cursor direction keys for communicating direction information and command selections to processor 804 and for controlling cursor movement on a display or other output device 812. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism, or other type of control device. An input device 814 may include a combination of multiple different input devices, such as a video camera and a depth sensor.

In another embodiment, computer system 800 may comprise an Internet of Things (IoT) device in which one or more of the output device 812, input device 814, and control device 816 are omitted. Or, in such an embodiment, the input device 814 may comprise one or more cameras, motion detectors, thermometers, microphones, seismic detectors, other sensors or detectors, measurement devices or encoders, and the output device 812 may comprise a special-purpose display such as a single-line LED or LCD display, one or more indicators, a display panel, a meter, a valve, a solenoid, an actuator or a servo.

When computer system 800 is a mobile computing device, input device 814 may comprise a global positioning system (GPS) receiver coupled to a GPS module that is capable of triangulating to a plurality of GPS satellites, determining and generating geo-location or position data such as latitude-longitude values for a geophysical location of the computer system 800. Output device 812 may include hardware, software, firmware, and interfaces for generating position reporting packets, notifications, pulse or heartbeat signals, or other recurring data transmissions that specify a position of the computer system 800, alone or in combination with other application-specific data, directed toward host computer 824 or server computer 830.

Computer system 800 may implement the techniques described herein using customized hard-wired logic, at least one ASIC or FPGA, firmware, and/or program instructions or logic which, when loaded and used or executed in combination with the computer system, causes or programs the computer system to operate as a special-purpose machine. According to one embodiment, the techniques herein are performed by computer system 800 in response to processor 804 executing at least one sequence of at least one instruction contained in main memory 806. Such instructions may be read into main memory 806 from another storage medium, such as storage 810. Execution of the sequences of instructions contained in main memory 806 causes processor 804 to perform the process steps described herein. In alternative embodiments, hard-wired circuitry may be used in place of or in combination with software instructions.

The term "storage media," as used herein, refers to any non-transitory media that store data and/or instructions that cause a machine to operate in a specific fashion. Such storage media may comprise non-volatile media and/or volatile media. Non-volatile media includes, for example, optical or magnetic disks, such as storage 810. Volatile media includes dynamic memory, such as memory 806. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire, and fiber optics, including the wires that comprise a bus of I/O subsystem 802. Transmission media can also take the form of acoustic or light waves, such as those generated during radio-wave and infrared data communications.

Various forms of media may be involved in carrying at least one sequence of at least one instruction to processor 804 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 800 can receive the data on the communication link and convert the data to a format that can be read by computer system 800. For instance, a receiver such as a radio frequency antenna or an infrared detector can receive the data carried in a wireless or optical signal and appropriate circuitry can provide the data to I/O subsystem 802, such as placing the data on a bus. I/O subsystem 802 carries the data to memory 806, from which processor 804 retrieves and executes the instructions. The instructions received by memory 806 may optionally be stored on storage 810 either before or after execution by processor 804.

Computer system 800 also includes a communication interface 818 coupled to the I/O subsystem 802. Communication interface 818 provides a two-way data communication coupling to one or more network links 820 that are directly or indirectly connected to at least one communication network, such as network 822 or a public or private cloud on the Internet. For example, communication interface 818 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 822 broadly represents a local area network (LAN), wide-area network (WAN), campus network, internetwork, or any combination thereof. Communication interface 818 may comprise a LAN card to provide a data communication connection to a compatible LAN, a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 818 sends and receives electrical, electromagnetic, or optical signals over signal paths that carry digital data streams representing various types of information.

Network link 820 typically provides electrical, electromagnetic, or optical data communication directly or through at least one network to other data devices, using, for example, satellite, cellular, Wi-Fi, or BLUETOOTH technology. For example, network link 820 may provide a connection through a network 822 to a host computer 824.

Furthermore, network link 820 may provide a connection through network 822 or to other computing devices via internetworking devices and/or computers that are operated by an Internet Service Provider (ISP) 826. ISP 826 provides data communication services through a world-wide packet data communication network represented as internet 828. A server computer 830 may be coupled to internet 828. Server computer 830 broadly represents any computer, data center, virtual machine or virtual computing instance with or without a hypervisor, or computer executing a containerized program system such as DOCKER or KUBERNETES. Server computer 830 may represent an electronic digital service that is implemented using more than one computer or instance, and that is accessed and used by transmitting web services requests, uniform resource locator (URL) strings with parameters in HTTP payloads, API calls, app services calls, or other service calls. Computer system 800 and server computer 830 may form elements of a distributed computing system that includes other computers, a processing cluster, a server farm, or other organizations of computers that cooperate to perform tasks or execute applications or services. Server computer 830 may comprise one or more sets of instructions that are organized as modules, methods, objects, functions, routines, or calls. The instructions may be organized as one or more computer programs, operating system services, or application programs, including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 830 may comprise a web application server that hosts a presentation layer, application layer and data storage layer such as a relational database system using structured query language (SQL) or no SQL, an object store, a graph database, a flat file system or other data storage.

Computer system 800 can send messages and receive data and instructions, including program code, through the network(s), network link 820, and communication interface 818. In the Internet example, a server computer 830 might transmit a requested code for an application program through Internet 828, ISP 826, local network 822, and communication interface 818. The received code may be executed by processor 804 as it is received and/or stored in storage 810 or other non-volatile storage for later execution.

The execution of instructions, as described in this section, may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 804. While each processor 804 or core of the processor executes a single task at a time, computer system 800 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
using an application server instance, receiving from a user computer, input specifying definitions of two or more stages, each of the two or more stages representing an attribute of one or more end-user profiles that have undertaken one or more interactions, using computing devices associated with the one or more end-user profiles, with one or more networked computers different from the application server instance;
using the application server instance, receiving from the user computer a selection of a particular stage among the two or more stages, and in response thereto, generating and transmitting to the user computer, presentation instructions which, when rendered at the user computer, cause generating and displaying a graphical user interface comprising a virtual canvas, a palette comprising a plurality of different graphical icons each representing at least an entry condition and an activation order for digital presentation of information;

using the application server instance receiving, from the user computer, a plurality of first input signals that specify at least two visual selection and dragging operations to move copies of an entry condition icon and an activation icon from the palette to the virtual canvas;

using the application server instance receiving, from the user computer, a first selection of the entry condition icon and a plurality of second input signals that specify one or more rules to match one or more subsets of the one or more end-user profiles and one or more subsets of the one or more interactions;

using the application server instance receiving, from the user computer, a second selection of the activation icon and a plurality of third input signals that specify one or more order attributes of the activation order for the digital presentation of information;

using the application server instance, accessing a digital data repository storing records of first interactions of a first plurality of profiles with a plurality of other computers, determining that the records specify a second plurality of profiles from among the first plurality of profiles that are associated with second interactions that match the one or more rules, and in response thereto, automatically forming and transmitting, to one or more digital presentation channels, a particular activation order to execute the digital presentation of information to the one or more subsets of the one or more end-user profiles based on the one or more order attributes.

2. The computer-implemented method of claim 1, further comprising, in response to a portion of the second input signals that specify the one or more rules to match the one or more subsets of the one or more end-user profiles, automatically querying a profiles database to select one or more counts of the one or more end-user profiles that match the one or more rules and displaying the one or more counts in the graphical user interface.

3. The computer-implemented method of claim 1, further comprising:

generating and transmitting to a user computer, the presentation instructions which when rendered at the user computer cause generating and displaying the palette comprising other graphical icons including a wait state icon representing a wait state, and a transition condition for the particular stage;

using the application server instance receiving, from the user computer, fourth input signals that specify a further visual selection and dragging operation to move a copy of the wait state icon to the virtual canvas;

the particular activation order to execute the digital presentation of information to the one or more subsets of the one or more end-user profiles being scheduled based on a wait time value that is associated with the copy of the wait state icon.

4. The computer-implemented method of claim 1, further comprising:

generating and transmitting to a user computer, the presentation instructions which when rendered at the user computer cause generating and displaying the palette comprising a milestone widget;

using the application server instance receiving, from the user computer, fourth input signals that specify a further visual selection of the milestone widget and one or more second rules to match one or more subsets of the one or more end-user profiles and one or more subsets of the interactions, and in response thereto, the application server instance automatically instantiating a second entry point icon in a second particular stage among the two or more stages and populating entry point attributes of the second entry point icon based on the second rules.

5. The method of claim 4, further comprising, using the application server instance, accessing the digital data repository, and determining that the records specify a third plurality of profiles from among the first plurality of profiles that are associated with fourth interactions that match the one or more second rules of the second entry point, and in response thereto, automatically forming and transmitting, to one or more digital presentation channels, a second particular activation order to execute the digital presentation of information to the one or more subsets of the one or more end-user profiles based on the one or more order attributes.

6. The computer-implemented method of claim 1, the digital presentation of information comprising digital advertising.

7. The computer-implemented method of claim 6, the particular activation order to execute the digital presentation of information comprising a set of digital advertising order attributes and instructions including an identifier of a particular platform interface to a particular digital advertising platform from among a plurality of different digital advertising platforms.

8. The computer-implemented method of claim 1, further comprising creating and storing records of the two or more stages in association with a journey record specifying a virtual journey of the one or more end-user profiles via the one or more interactions to interoperate with the one or more networked computers.

9. The computer-implemented method of claim 8, the virtual journey being associated with interactions indicating awareness of a product that is offered via the one or more networked computers, intent to acquire the product, and an acquisition transaction to acquire the product.

10. The computer-implemented method of claim 1, further comprising, using the application server instance receiving, from the user computer:

a third selection of a decision point icon in the palette and a plurality of fourth input signals that specify dragging and dropping the decision point icon into the virtual canvas and rules for two or more conditions associated with the decision point icon;

a fourth selection of any of a second activation icon and a wait step icon in the palette and a plurality of fifth input signals that specify dragging and dropping the second activation icon or the wait step icon into the virtual canvas in a first position serially after one of the two or more conditions.

11. The computer-implemented method of claim 10, further comprising, using the application server instance receiving, from the user computer, a fifth selection of a merge icon in the palette and a plurality of sixth input signals that specify dragging and dropping the merge icon into the virtual canvas in a second position serially after two of the two or more conditions.

12. The computer-implemented method of claim 10, further comprising, using the application server instance, accessing the digital data repository and determining that the records specify a third plurality of profiles from among the first plurality of profiles that are associated with fourth interactions that match the rules for two or more conditions associated with the decision point icon, and in response thereto, automatically forming and transmitting, to one or more digital presentation channels, a second particular activation order to execute the digital presentation of information to the one or more subsets of the one or more end-user profiles based on the one or more order attributes.

13. One or more non-transitory computer-readable storage media storing one or more sequences of instructions which, when executed using one or more processors, cause the one or more processors to execute:
   using an application server instance, receiving from a user computer, input specifying definitions of two or more stages, each of the stages representing an attribute of one or more end-user profiles that have undertaken one or more interactions, using computing devices associated with the one or more end-user profiles, with one or more networked computers different from the application server instance;
   using the application server instance, receiving from the user computer a selection of a particular stage among the two or more stages, and in response thereto, generating and transmitting to a user computer, presentation instructions which when rendered at the user computer cause generating and displaying a graphical user interface comprising a virtual canvas, a palette comprising a plurality of different graphical icons each representing at least an entry condition and an activation order for digital presentation of information,
   using the application server instance receiving, from the user computer, a plurality of first input signals that specify at least two visual selection and dragging operations to move copies of an entry condition icon and an activation icon from the palette to the virtual canvas;
   using the application server instance receiving, from the user computer, a first selection of the entry condition icon and a plurality of second input signals that specify one or more rules to match one or more subsets of the one or more end-user profiles and one or more subsets of the interactions;
   using the application server instance receiving, from the user computer, a second selection of the activation icon and a plurality of third input signals that specify one or more order attributes of the activation order for the digital presentation of information;
   using the application server instance, accessing a digital data repository storing records of first interactions of a first plurality of profiles with a plurality of other computers, determining that the records specify a second plurality of profiles from among the first plurality of profiles that are associated with second interactions that match the one or more rules, and in response thereto, automatically forming and transmitting, to one or more digital presentation channels, a particular activation order to execute the digital presentation of information to the one or more subsets of the one or more end-user profiles based on the one or more order attributes.

14. The one or more non-transitory computer-readable storage media of claim 13, further comprising one or more sequences of instructions which, when executed using the one or more processors, cause the one or more processors to execute, in response to a portion of the second input signals that specify the one or more rules to match the one or more subsets of the one or more end-user profiles, automatically querying a profiles database to select one or more counts of the one or more end-user profiles that match the one or more rules and displaying the one or more counts in the graphical user interface.

15. The one or more non-transitory computer-readable storage media of claim 13, further comprising one or more sequences of instructions which, when executed using the one or more processors, cause the one or more processors to execute:
   generating and transmitting to a user computer, the presentation instructions which when rendered at the user computer cause generating and displaying the palette comprising other graphical icons each representing a wait state, and a transition condition for the particular stage;
   using the application server instance receiving, from the user computer, fourth input signals that specify a further visual selection and dragging operation to move a copy of the wait state icon to the virtual canvas;
   the particular activation order to execute the digital presentation of information to the one or more subsets of the one or more end-user profiles being scheduled based on a wait time value that is associated with the copy of the wait state icon.

16. The one or more non-transitory computer-readable storage media of claim 13, further comprising one or more sequences of instructions which, when executed using the one or more processors, cause the one or more processors to execute:
   generating and transmitting to a user computer, the presentation instructions which when rendered at the user computer cause generating and displaying the palette comprising a milestone widget;
   using the application server instance receiving, from the user computer, fourth input signals that specify a further visual selection of the milestone widget and one or more second rules to match one or more subsets of the one or more end-user profiles and one or more subsets of the interactions, and in response thereto, the application server instance automatically instantiating a second entry point icon in a second particular stage among the two or more stages and populating entry point attributes of the second entry point icon based on the second rules.

17. The one or more non-transitory computer-readable storage media of claim 16, further comprising one or more sequences of instructions which, when executed using the one or more processors, cause the one or more processors to execute, using the application server instance, accessing the digital data repository and determining that the records specify a third plurality of profiles from among the first plurality of profiles that are associated with fourth interactions that match the one or more second rules of the second entry point, and in response thereto, automatically forming and transmitting, to one or more digital presentation channels, a second particular activation order to execute the digital presentation of information to the one or more subsets of the one or more end-user profiles based on the one or more order attributes.

18. The one or more non-transitory computer-readable storage media of claim 13, the digital presentation of information comprising digital advertising.

19. The one or more non-transitory computer-readable storage media of claim 18, the particular activation order to execute the digital presentation of information comprising a set of digital advertising order attributes and instructions including an identifier of a particular platform interface to a particular digital advertising platform from among a plurality of different digital advertising platforms.

20. The one or more non-transitory computer-readable storage media of claim 13, further comprising one or more sequences of instructions which, when executed using the one or more processors, cause the one or more processors to execute creating and storing records of the two or more stages in association with a journey record specifying a virtual journey of the one or more end-user profiles via the one or more interactions to interoperate with the one or more networked computers.

21. The one or more non-transitory computer-readable storage media of claim 20, the virtual journey being associated with interactions indicating awareness of a product that is offered via the one or more networked computers, intent to acquire the product, and an acquisition transaction to acquire the product.

22. The one or more non-transitory computer-readable storage media of claim 13, further comprising one or more sequences of instructions which, when executed using the one or more processors, cause the one or more processors to execute, using the application server instance receiving, from the user computer:
    a third selection of a decision point icon in the palette and a plurality of fourth input signals that specify dragging and dropping the decision point icon into the virtual canvas and rules for two or more conditions associated with the decision point icon;
    a fourth selection of any of a second activation icon and a wait step icon in the palette and a plurality of fifth input signals that specify dragging and dropping the second activation icon or the wait step icon into the virtual canvas in a first position serially after one of the two or more conditions.

23. The one or more non-transitory computer-readable storage media of claim 22, further comprising one or more sequences of instructions which, when executed using the one or more processors, cause the one or more processors to execute, using the application server instance receiving, from the user computer a fifth selection of a merge icon in the palette and a plurality of sixth input signals that specify dragging and dropping the merge icon into the virtual canvas in a second position serially after two of the two or more conditions.

24. The one or more non-transitory computer-readable storage media of claim 22, further comprising one or more sequences of instructions which, when executed using the one or more processors, cause the one or more processors to execute, using the application server instance, accessing the digital data repository and determining that the records specify a third plurality of profiles from among the first plurality of profiles that are associated with fourth interactions that match the rules for two or more conditions associated with the decision point icon, and in response thereto, automatically forming and transmitting, to one or more digital presentation channels, a second particular activation order to execute the digital presentation of information to the one or more subsets of the one or more end-user profiles based on the one or more order attributes.

\* \* \* \* \*